(12) United States Patent
Glick et al.

(10) Patent No.: US 6,596,208 B1
(45) Date of Patent: Jul. 22, 2003

(54) METHOD OF PRODUCING RUBBER PAVING BLOCKS

(76) Inventors: Moses B. Glick, 2190 Pequea La., Lancaster, PA (US) 17602; Stephen S. Stoltzfus, 149 N. Red School Rd., Morgantown, PA (US) 19543; Monroe Z. Stoltzfus, 49 Wolf Rd., Akron, PA (US) 17501

( * ) Notice: Subject to any disclaimer, the term of this patent is extended or adjusted under 35 U.S.C. 154(b) by 262 days.

(21) Appl. No.: 09/777,344

(22) Filed: Feb. 6, 2001

Related U.S. Application Data

(60) Provisional application No. 60/180,644, filed on Feb. 7, 2000.

(51) Int. Cl.[7] ............................ B29C 41/22; B29B 11/14
(52) U.S. Cl. .................... 264/78; 264/109; 264/112; 264/113; 264/126; 264/245; 264/331.13; 264/912
(58) Field of Search ....................... 264/78, 109–128, 264/245, 331.13, 912

(56) References Cited

U.S. PATENT DOCUMENTS 3,894,686 A * 7/1975 Weinberg et al. ............. 238/8
4,970,043 A * 11/1990 Doan et al. ................. 264/237
5,425,904 A *  6/1995 Smits ........................ 264/115

* cited by examiner

Primary Examiner—Stephen J. Lechert, Jr.
(74) Attorney, Agent, or Firm—Miller Law Group, PLLC

(57) ABSTRACT

An automated process for manufacturing rubber paving blocks uses crumb rubber recovered from used automotive tires. A production line in which the molds are emptied of the formed rubber paving block and then filled with a fresh crumb rubber mixture is balanced with an oven line in which the compressed crumb rubber mixture is heated, cured and cooled before being returned to the production line for further processing. The mold includes a lid having latching mechanisms that are actuated by compressed air. The formed rubber paving block is removed from the cooled mold through a compressed air extraction mechanism so that the formed block is not damaged during the extraction process. The rubber paving block is formed with a textured bottom surface having a central depressed disk and a plurality of grooves forming interconnected passageways for water to pass beneath the blocks when installed.

20 Claims, 17 Drawing Sheets

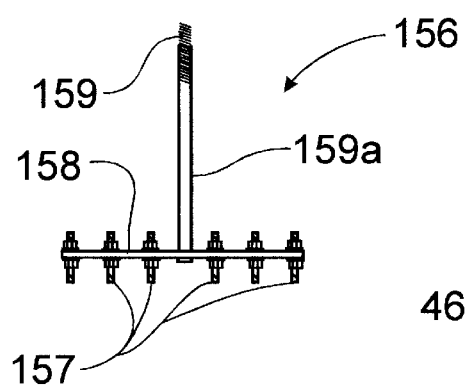
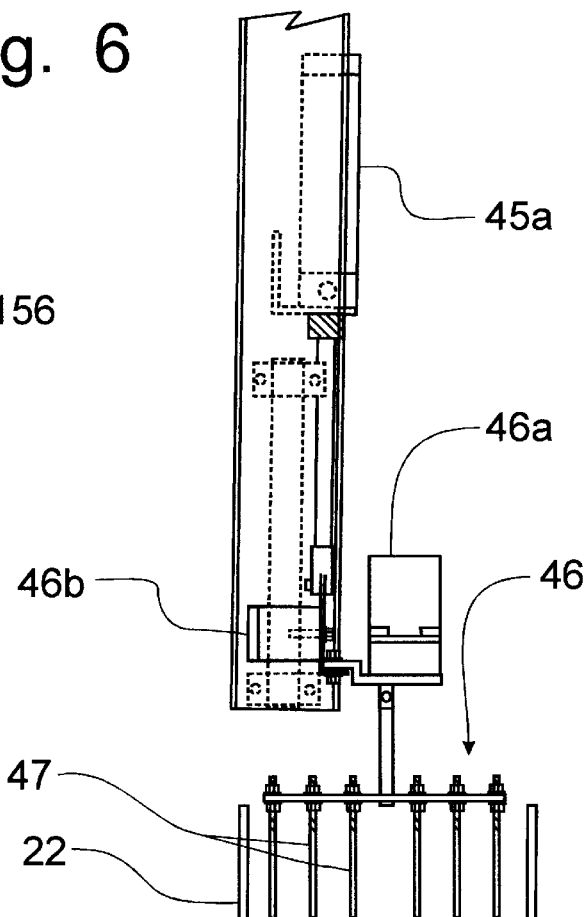
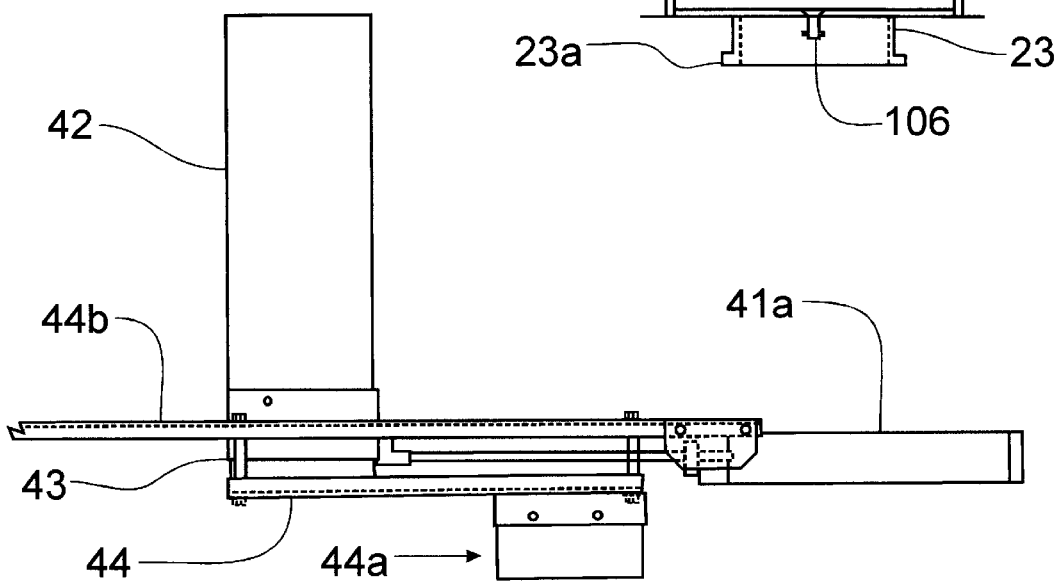

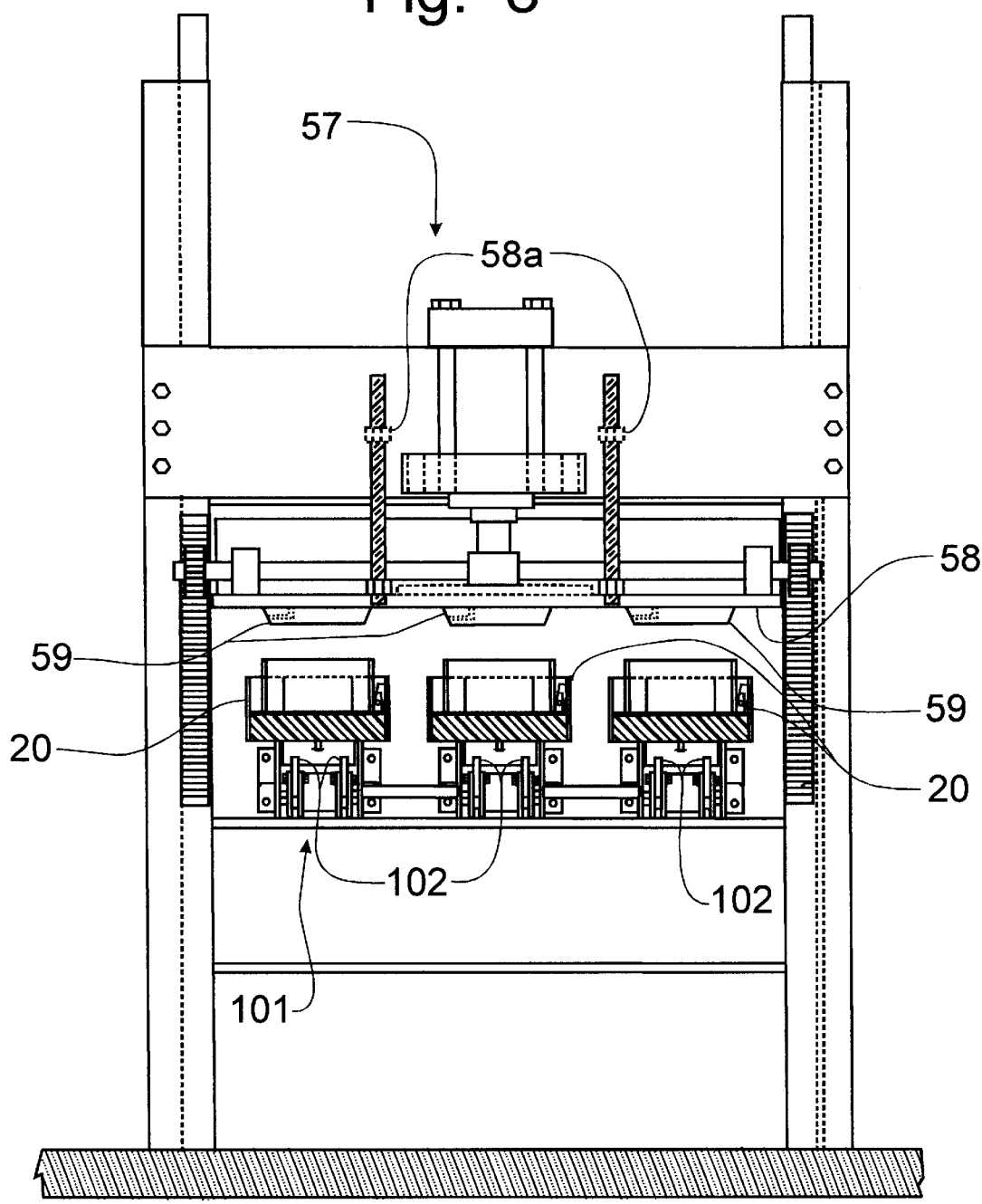

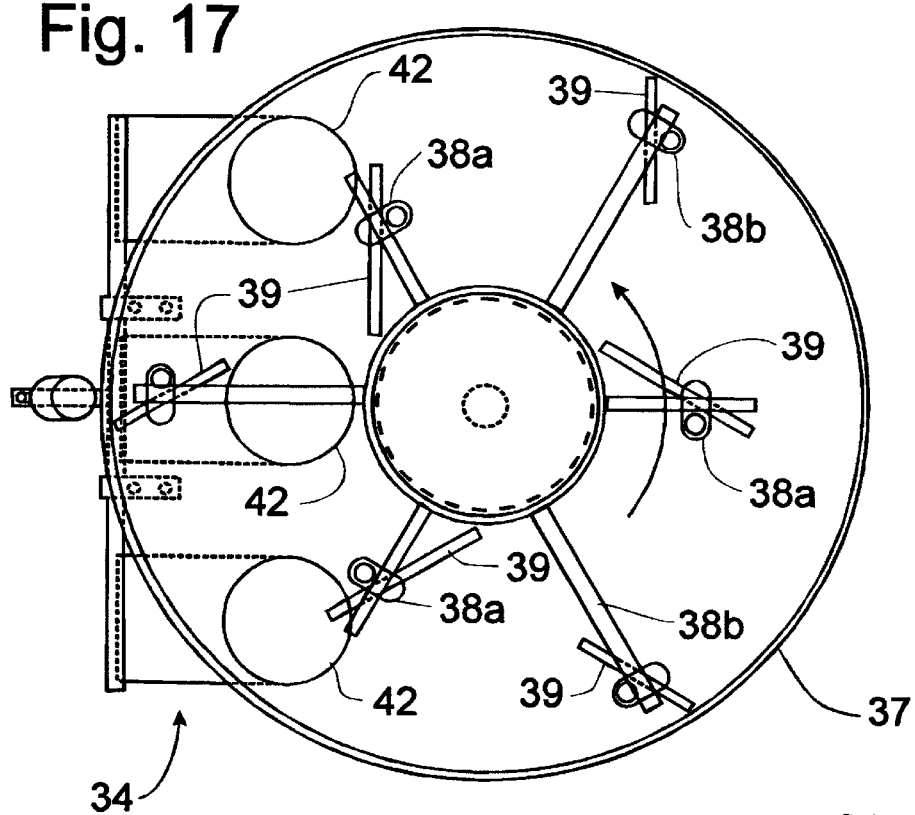
Fig. 17
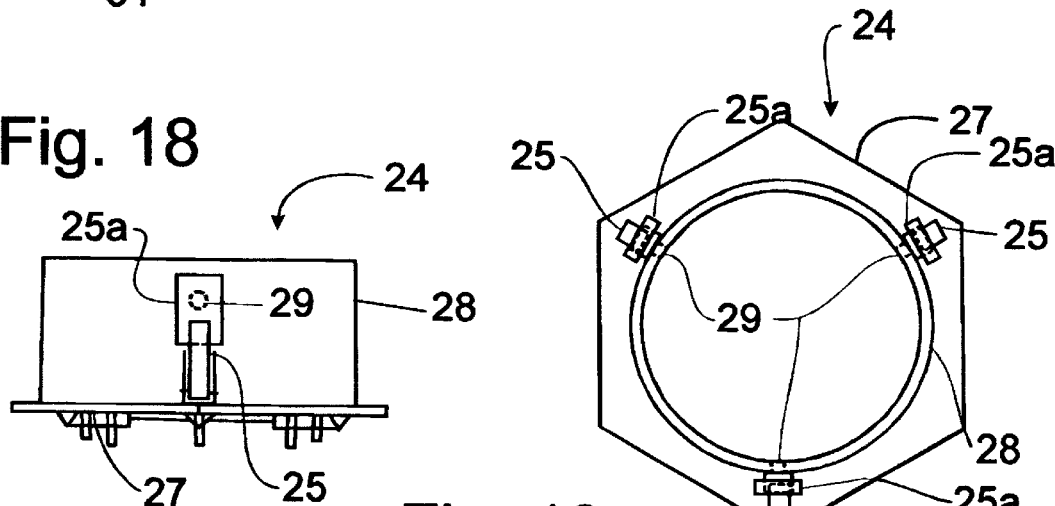
Fig. 18
Fig. 19

METHOD OF PRODUCING RUBBER PAVING BLOCKS

This application claim the benefit of provisional application Ser. No. 60/180,644 filed Feb. 7, 2000.

BACKGROUND OF THE INVENTION

This invention relates generally to a process for recycling rubber from tire carcasses and, more particularly, to a process for mass producing rubber paving blocks.

The disposition of used tire carcasses and other similar material has presented a major problem to the tire industry. A number of attempts have been made to recycle the rubber from the tire carcasses, but none have made a significant impact on the growing numbers of used tires that must be disposed each year.

The recycling efforts directed to used tires have devised a process for creating "crumb rubber" from the tire carcasses. Crumb rubber is essentially the rubber portion of the used tires reduced to individual particles that are a ¼ inch in diameter or smaller. It has been found that this crumb rubber product can be used as a base material to create a number of different products, including paving blocks and other structural products that can provide a surface on which people can walk and vehicles can traverse.

It would be desirable to provide a process by which rubber paving blocks and other similar products can be mass produced in an economically efficient manner. Such a method and the apparatus for practicing the method would enable such products to be available to the public at a cost competitive price with other materials, while significantly decreasing the environmental problems associated with the disposition of used tire carcasses by increasing the recycling thereof.

SUMMARY OF THE INVENTION

It is an object of this invention to overcome the disadvantages of the prior art by providing an automated process for manufacturing rubber paving blocks.

It is another object of this invention to provide a method of manufacturing rubber paving blocks that minimizes the utilization of manual labor.

It is an advantage of this invention that tire carcasses will be recycled through the process of manufacturing rubber paving blocks.

It is a feature of this invention that process stations are provided to accomplish the individual steps in manufacturing rubber paving blocks.

It is another feature of this invention that the manufacturing line includes a production line and an oven line interconnected by transfer stations that provide a continuous manufacturing process.

It is another advantage of this invention that the oven line incorporates sufficient time for curing the rubber compound and for the subsequent cooling of the molds before being returned to the production line.

It is still another feature of this invention that pneumatics are incorporated into the manufacturing process.

It is still another object of this invention to provide a method and apparatus for extracting the formed rubber paving block from the mold without damaging the block.

It is yet another object of this invention to provide a lid for the mold which will latch to compress the rubber compound, yet easily release when extraction of the cured rubber paving block is desired.

It is yet another feature of this invention that the lid for the mold includes a latching mechanism that can be actuated by compressed air for both the latching and unlatching functions in the manufacturing process.

It is still another advantage of this invention that the manufacturing process allows for the introduction of a color layer for the exposed surface of the rubber paving block with a less expensive base layer.

It is yet another object of this invention to provide a rubber paving block with a base layer having channels for the passage of water beneath the paving block.

It is yet another feature of this invention that the bottom surface of the rubber paving block is formed with grooves extending radially from a center depressed disk.

It is yet another advantage of this invention that the interconnected grooves and depressed central disk formed into the bottom surface of the formed rubber paving block are operable to provide a passageway for water irrespective of the orientation of the paving block when installed.

It is still another feature of this invention that the central depressed disk in the bottom surface of the formed rubber paving block exerts sufficient tension into the formed block to prevent an upward turning of the rubber material at the exterior corners of the formed block.

It is still another object of this invention to provide a formed rubber paving block with a textured bottom surface and a smooth top surface.

It is a further object of this invention to provide a process that provides a product utilizing crumb rubber made from used tire carcasses, thereby providing an end product for recycling automotive tires.

It is still a further object of this invention to provide an automated process for manufacturing rubber paving blocks from recycled automotive tires which is durable in construction, inexpensive of manufacture, carefree of maintenance, facile in assemblage, and simple and effective in use.

It is yet a further object of this invention to provide a formed rubber paving block which is durable in construction, in expensive of manufacture, carefree of maintenance, facile in assemblage, and simple and effective in use.

These and other objects, features and advantages are accomplished according to the instant invention in which an automated process for manufacturing rubber paving blocks uses crumb rubber recovered from used automotive tires. The manufacturing process includes a production line in which the molds are emptied of the formed rubber paving block and then filled with a fresh crumb rubber mixture, and a balanced oven line in which the compressed crumb rubber mixture is heated, cured and cooled before being returned to the production line for further processing. The production line includes a station for each individual step in the manufacturing process. The mold includes a lid having latching mechanisms that are actuated by compressed air blasts for both the latching and unlatching functions. The formed rubber paving block is removed from the cooled mold through an extraction mechanism that both engages the textured surface of the formed block and lifts the block through a compressed air apparatus so that the formed block is not damaged during the extraction process. The rubber paving block is formed with a textured bottom surface having a central depressed disk and a plurality of grooves extending radially from the central depressed disk. The textured bottom surface of the formed block provides an interconnected passageway for water to pass beneath the blocks when installed. The central depressed disk also tenses the formed rubber block to restrain the peripheral edges from turning upwardly.

BRIEF DESCRIPTION OF THE DRAWINGS

The advantages of this invention will become apparent upon consideration of the following detailed disclosure of the invention, especially when taken in conjunction with the accompanying drawings wherein:

FIG. 5 is an enlarged schematic side elevational view of the apparatus for filling crumb rubber and binder mixture in the molds at both of the fill material stations of the production line shown in FIG. 3;

FIG. 6 is an enlarged schematic side elevational view of the apparatus for leveling the crumb rubber and binder mixture in the mold at both of the level material stations of the production line shown in FIG. 3;

FIG. 6a is an elevational view of an alternative leveling head to be used in the apparatus depicted in FIG. 6;

FIG. 8 is an enlarged schematic end elevational view of the apparatus at the latch press station of the production line shown in FIG. 3;

FIG. 17 is an enlarged top plan view of the material mixing station of the production line shown in FIG. 3;

FIG. 18 is a side elevational view of the lid for the mold;

FIG. 19 is a top plan view of the mold lid shown in FIG. 18;

DETAILED DESCRIPTION OF THE INVENTIONS

Figure 20:
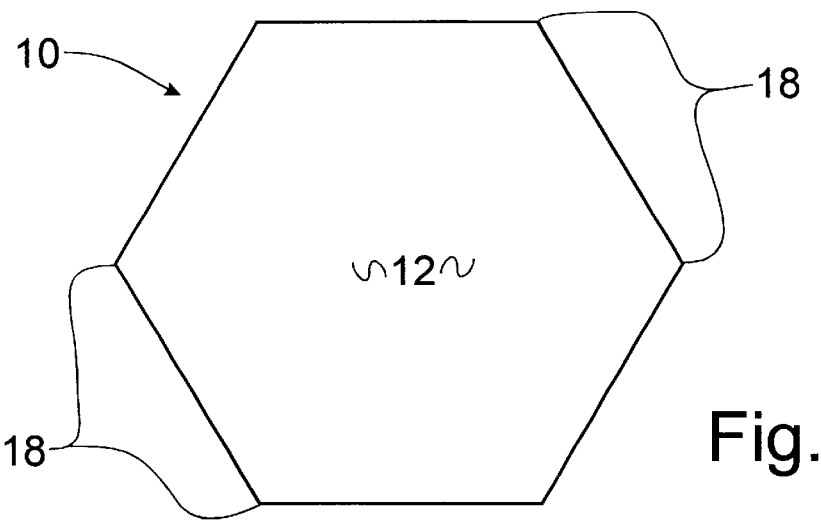
FIG. 20 is a top plan view of the paving block produced by the process incorporating the principles of the instant invention.
Figure 21:
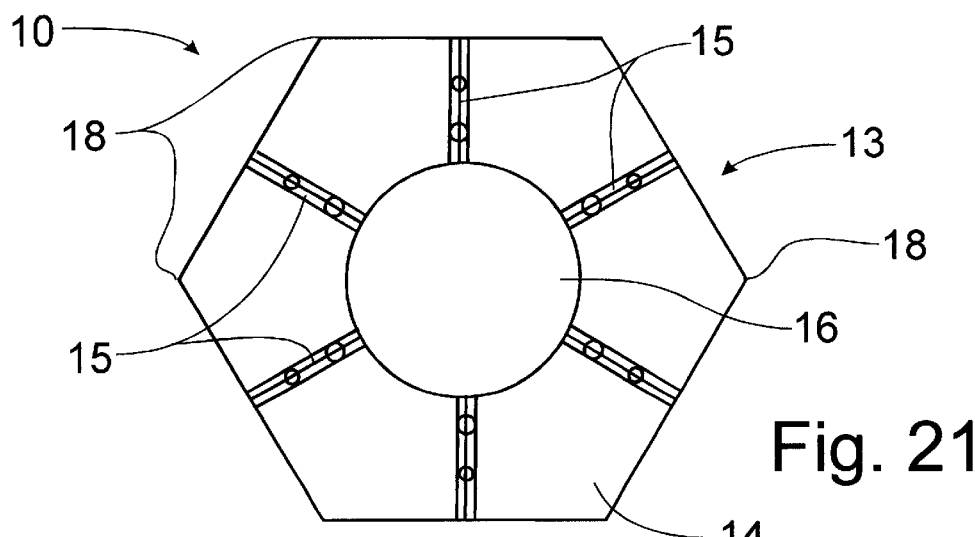
FIG. 21 is a bottom plan view of the paving block shown in FIG. 20.
Figure 22:
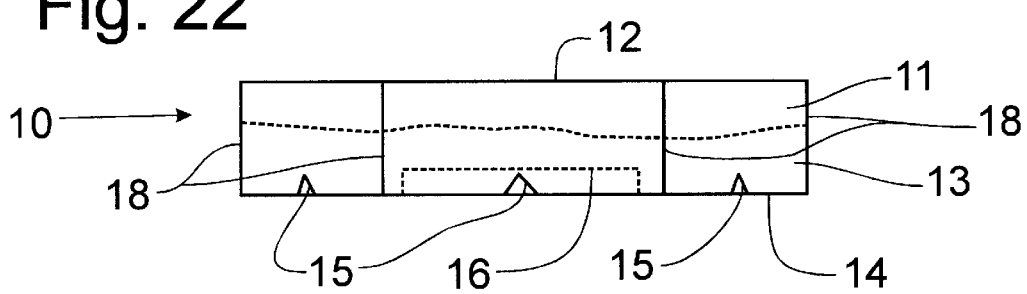
FIG. 22 is a side elevational view of the paving block shown in FIG. 21 with a dashed line representing the transition between the color material portion and the black material portion of the paving block.

Referring now to FIGS. 20–22, a formed rubber paving block manufactured by the process incorporating the principles of the instant invention can best be seen. The paving block 10 can be of any desired shape, such as the hexagonal shape shown in FIGS. 20 and 21, and will preferably be formed with a color material portion 11 having a top surface 12 which is placed for viewing and traversing by the users of the block 10. The paving block 10 is also formed with a black material portion 13 which has a formed textured bottom surface 14 having grooves 15 that is intended to engage the material upon which this paving block 10 is set and to provide drainage paths along which any moisture may flow beneath the block 10. The grooves 15 interconnect the outer periphery of the block 10 with a central circular depression 16 into the bottom surface 14 of the block 10 to provide a flow communication with all of the grooves 15.

The central depression 16 provide another important function in the formation and utilization of the block 10. The additional compaction created by the disk fitted to the lid 24 of the mold 20, as will be described below, places a tension into the block 10 to keep the corners 18 of the block 10 from turning upwardly. For a hexagonal block 10 as represented in FIGS. 20–22, a central circular depression 16 as depicted has been found to create sufficient additional compaction and tension within the block 10 to keep all of the corners 18 from turning upwardly. Other shapes of block 10 may require different placement of the depression or depression.

For example, a rectangularly shaped paving block, having dimensions of approximately six inches by twelve inches, is best formed with two depression disk, one located toward the end of the major axis of the block equidistantly from the corners and spaced a like distance from the end of the block. The shape of the depression 16 need not be circular and, in fact, a shape mimicking the shape of the block 10 and aligned therewith may produce superior results.

The paving block 10 could be used to provide a patio decking or a driveway having a base of leveled stone upon which the paving block are set against one another to form the desk (not shown). The durability and yielding feel of the block lend themselves to another favored use for the block as the flooring in a horse barn. The blocks can be set on a sub-floor as a flooring material for a foyer or the like. Yet another potential use for the paving blocks 10 is to provide a walking surface for flat roofs on building to protect the rubber covering thereon. The individual blocks 10 can be simply set against one another or possibly glued together. The individual paving blocks can be formed with any color or even patterns, or could be formed as natural black rubber throughout without having discrete portions 11, 13. Preferably, the color material portion 11 will not extend through the entire depth of the paving block 10 because of cost considerations, although the entire paving block 10 could be formed of a single color material portion.

The mold 20 for forming the paving block 10 is best seen in FIGS. 7–10, the lid portion being seen best in FIGS. 18 and 19. The mold 20 has a shaped body portion 22, shown in the preferred hexagonal shape, an integral bottom portion 21 and a removable lid 24. All of the interior mold surfaces, i.e. the bottom surface of the lid 24, the interior wall of the body portion 22, and the top surface of the bottom portion 21, are coated with Teflon or other non-stick material. Latches 25 are mounted on the lid to engage the body portion 22 to secure the lid 24 in the proper position, as will be described in greater detail below, thereby compressing the bulk material placed into the mold 20 to form the paving block 10. The latches 25, preferably three of them, are located in a spaced configuration around the perimeter of the lid 24, as best seen in FIG. 19, in order to uniformly and positively engage the lid 24 to the body portion 22 for a uniform compression of the bulk material placed within the mold 20. The mold 20 is intended to circulate through the manufacturing system 30 described below between the production line and the oven line continuously producing paving blocks 10.

Figure 10A:
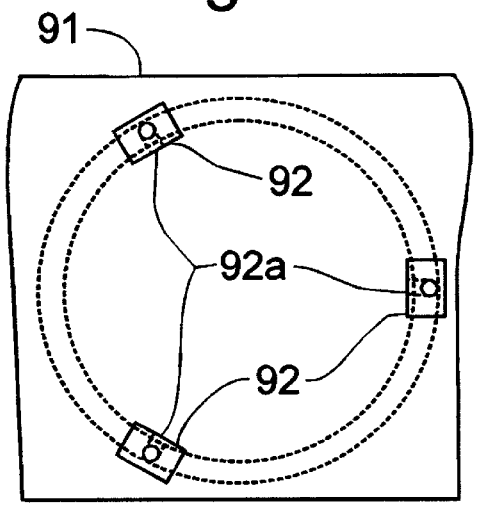
FIG. 10a is bottom plan view of the pneumatic unlatch member taken from the perspective of the mold in FIG. 10.

Referring now to FIGS. 18 and 19, the lid 24 is formed with a base member 27 having a shape to conform to the body portion 22 and to nest inside of the body portion 22. The lid 24 is also formed with a tubular, circular columnar member 28 fixed as by welding to the base portion 27 to be integral therewith. The latches 25 are pivotally carried on the base member 27 to be engageable with corresponding latch holes 26 in the body portion 22, as depicted in FIGS. 9 and 10. When the lid 24 has compressed the material within the mold 20 sufficiently, the latches 25 will align with the latch holes 26 to retain the lid 24 in the compressing position throughout the curing stages through the oven line 70. The underside of the lid 24 is fitted with impression devices, such as angles, half rounds and a disk, to form the desired textured surface of the paving block 10 including the grooves 15 and the central depression 16.

Figure 1:
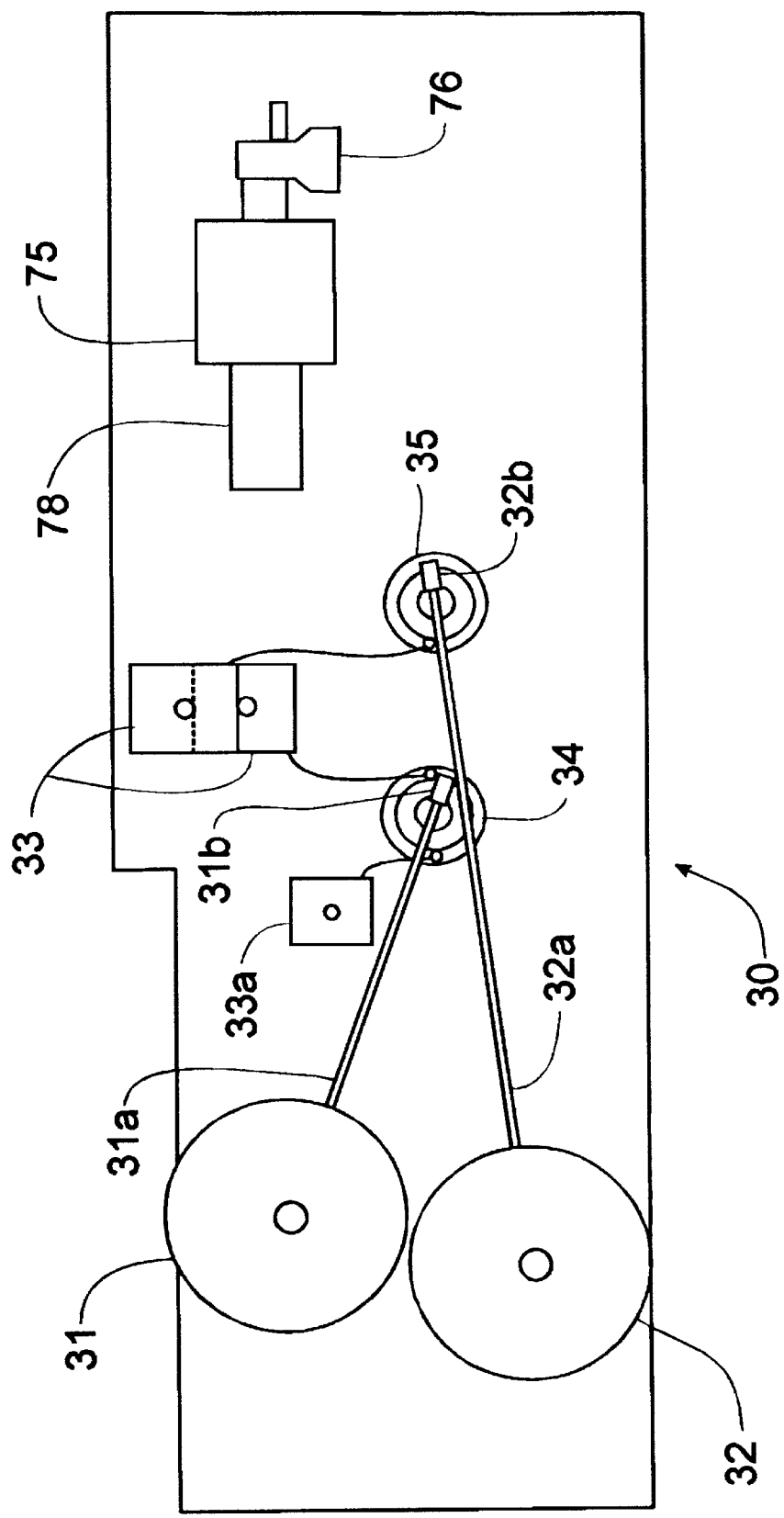
FIG. 1 is a schematic top plan view of the apparatus for mass producing rubber paving blocks from crumb rubber material, incorporating the principles of the instant invention.
Figure 2:
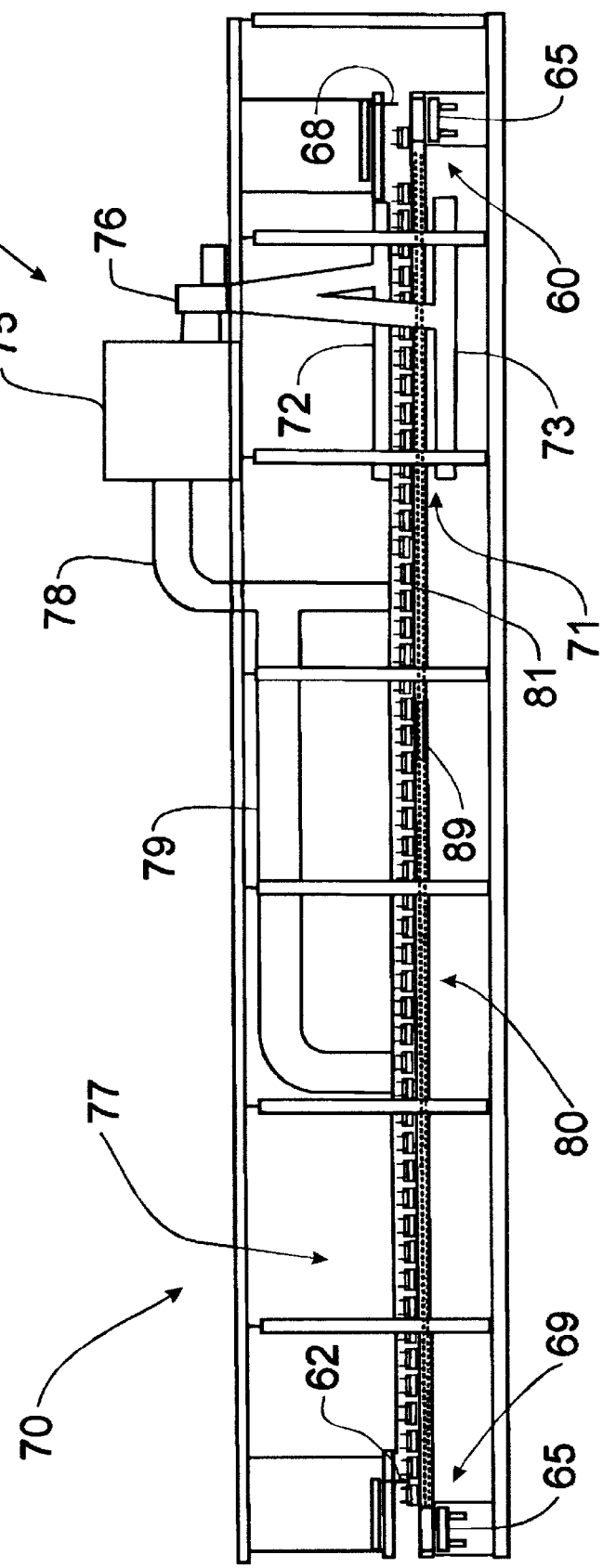
FIG. 2 is a schematic side elevational view of the oven line portion of the apparatus shown in FIG. 1.
Figure 3:
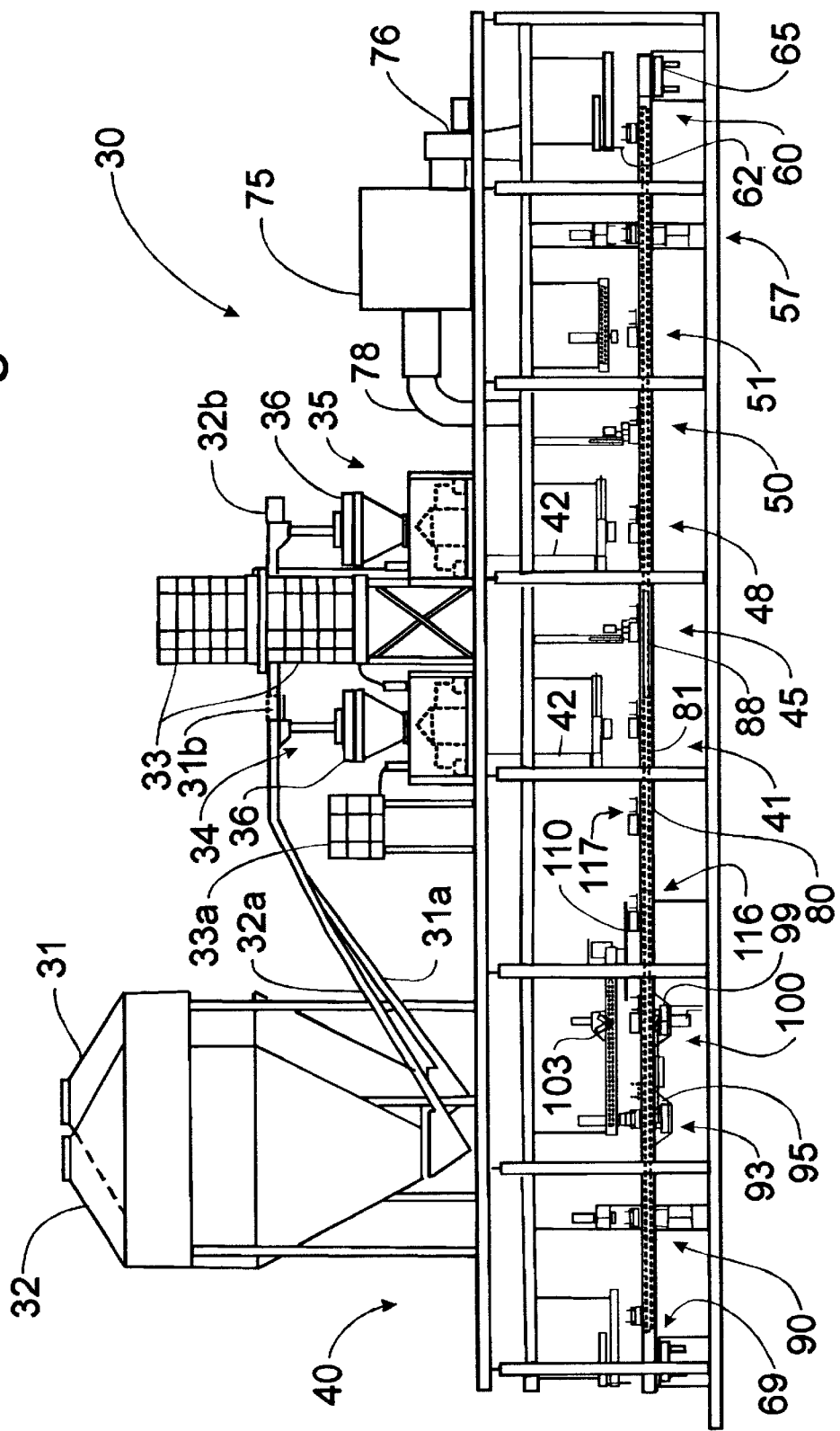
FIG. 3 is a schematic side elevational view of the production line portion of the apparatus shown in FIG. 1.
Figure 4:
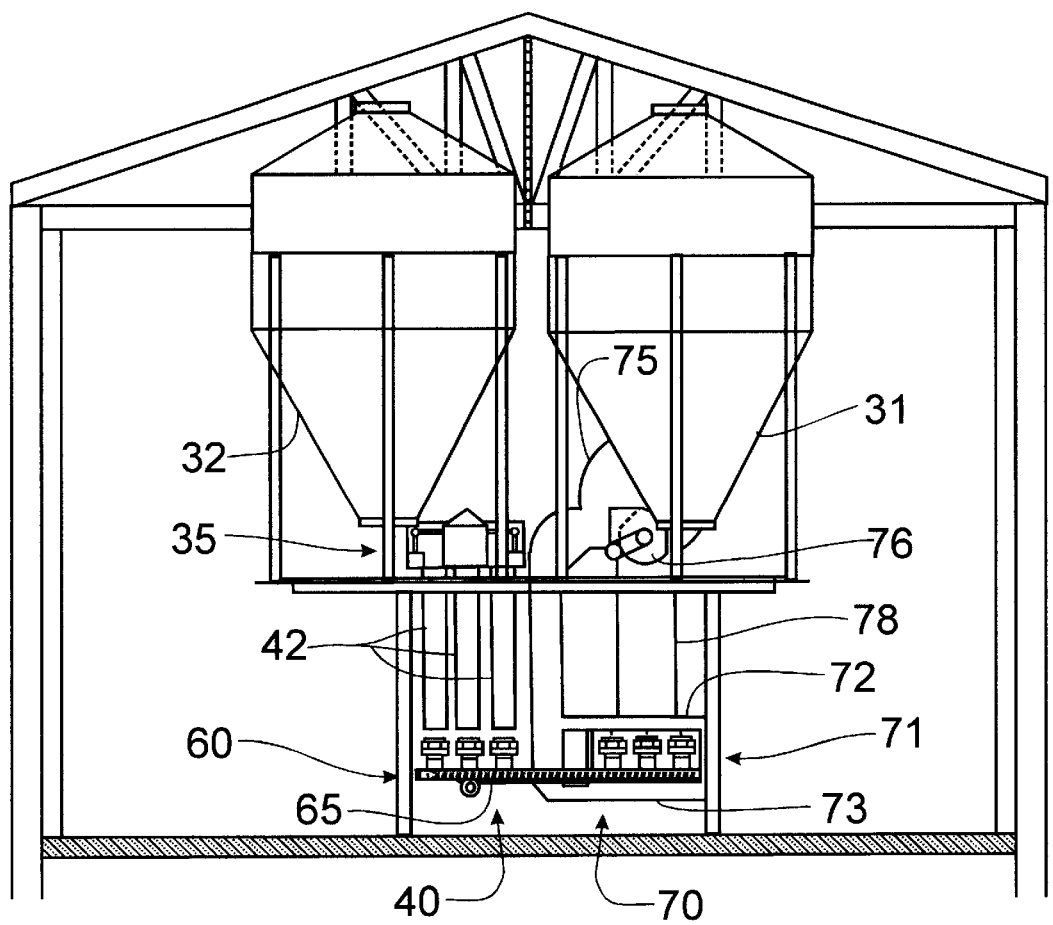
FIG. 4 is an enlarged schematic end elevational view of the production line portion of the apparatus shown in FIG. 1.

Referring now to FIGS. 1–4, an overview of the manufacturing system 30 can best be seen. The manufacturing system 30 includes storage bins 31, 32 for the crumb rubber material, forming the base material from which the paving blocks 10 are manufactured, and tanks 33 for the binder material, preferably moisture activated polyurethane, which when properly cured binds the crumb rubber particles together to form the paving block 10. The crumb rubber and binder are preferably mixed together in mixing systems 34, 35, corresponding to the color material and the black material portions 11, 13 of the paving block 10. The oven line 70 is best seen in FIGS. 2 and 4 and contains the process for curing the binder to form the paving block 10. The production line 40 is best seen in overview in FIG. 3 and comprises the portion of the manufacturing system 30 that contains the apparatus, described in greater detail below, for removing the cured paving block 10 from the mold 20 upon exiting the oven line 70 and then re-filling the mold 20 to re-form another paving block 10 to be sent into the oven line 70 for curing.

As depicted in FIG. 3, the material mixing systems 34, 35 are essentially identical. The color material mixing system 34 receives measured quantities of small diameter crumb rubber (preferably crumb rubber passing through a ⅛ inch screen) from the storage bin 31 via an auger loader 31a providing a measured quantity in the hopper 36 above the mixer 34 and binder from the storage tanks 33 and mixes the materials together with a dye to create the color fill material to be placed into the molds 20, as will be described in greater detail below. The black material mixing system 35 receives a larger diameter crumb rubber (preferably crumb rubber passing through a ¼ inch screen) from an auger loader 32a associated with the storage bin 32 to provide a measured quantity in the hopper 36 above the mixer 35 to be mixed with binder only to provide the black fill material.

Figure 16:
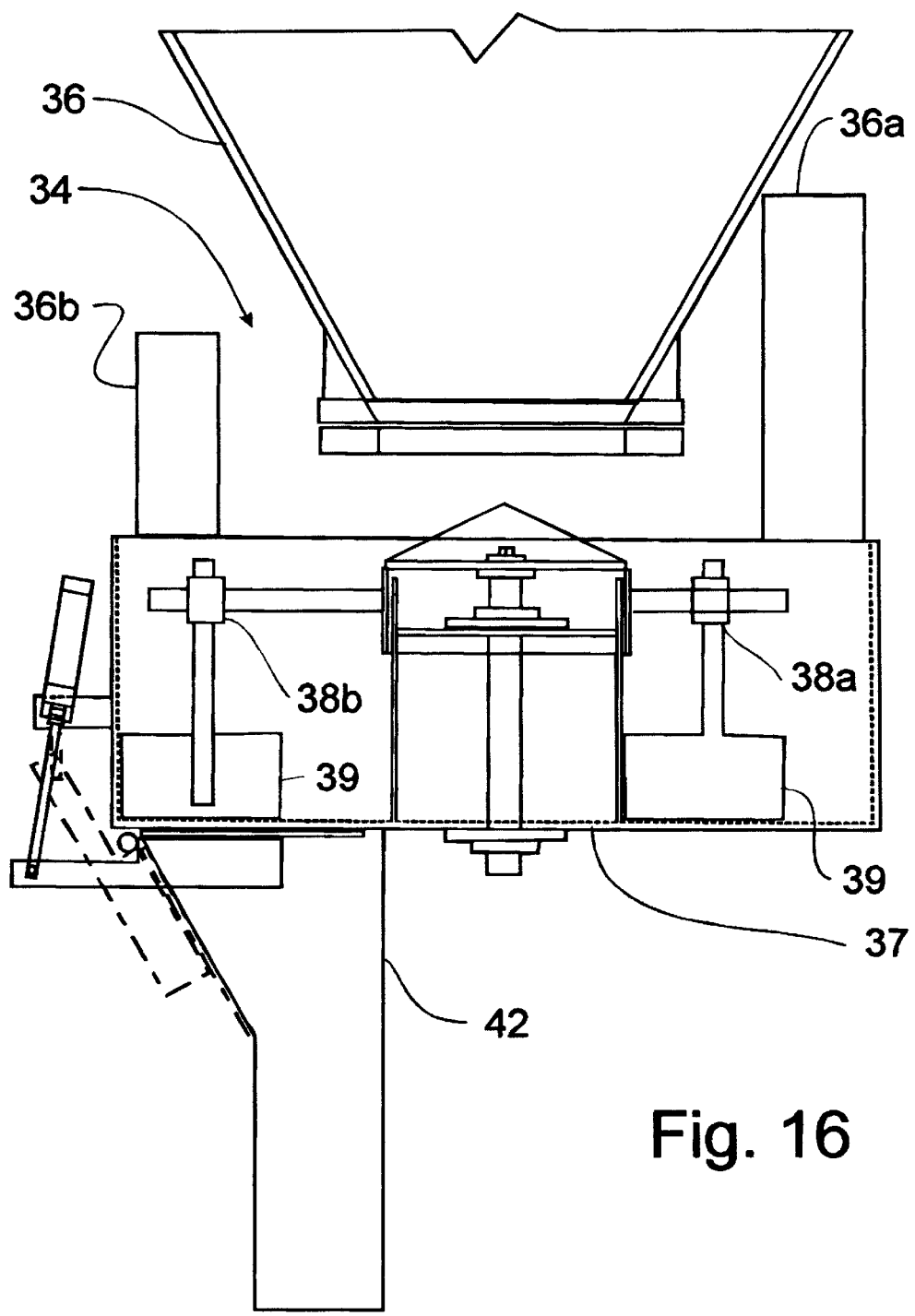
FIG. 16 is an enlarged schematic side elevational view of the color material mixing system station of the production line shown in FIG. 3 with an optional dye tube, the black material mixing station being substantially identical to the color material mixing station except for the binder and dye tubes.

As best seen in FIGS. 16–17, the mixers 34, 35 include a circular mixing tub 37 having a plurality of radially extending mixing arms 38a, 38b rotatable within the tub 37 to mix the materials placed therein. The shorter mixing arms 38a alternate with the longer mixing arms 38b to provide a proper mixing action. The shorter mixing arms 38a have paddles 39 that are angles to push the mixed material outwardly during rotation, while the longer mixing arms 38b have paddles 39 angled to push the mixed material inwardly during rotation. The bottom of the tub 37 is provided with three openings to which are attached the respective fill tubes 42 to convey the mixed material to the respective fill stations 41, 48, shown in FIG. 3. The paddles 39 are oriented to convey the mixed material into the fill tubes 42 through the openings, which are closed during the mixing operation. The primary difference between the mixers 34, 35 is that the colored material mixer 34 is provided with a measured tube 36b for dye material to be dumped into the tub 37 with the crumb rubber. The measured tube 36a for the binder material is preferably positioned on opposite sides of the tub 37 due to the positioning of the storage tanks 33 between the mixers 34, 35.

Referring now to the production line 40, the beginning of the continuous process incorporating the principles of the instant invention, actually starts in the middle of the production line 40 at the fill color material station 41. The production line 40, as well as the oven line 70, are formed to receive and process molds 20 three abreast, as depicted in FIG. 4, although one skilled in the art will readily realize that this is a matter of design choice, limited only by production objectives. The production line side 40 of the manufacturing system provides the handling of the raw materials and the removal of the finished product 10. The sets of molds 20 are preferably spaced longitudinally (with respect to the production line) about four feet apart. The oven line side 50 provides the proper environment for rapid curing and setting of the crumb rubber and binder. The abreast sets of molds 20 in the oven line are preferably only about one foot apart to maximize the time spent in the curing process.

The fill color material station 41 begins with an empty mold 20 with the lid 24 removed and placed in front of the body portion 22 following the removal of the paving block from the mold 20, as will be described in greater detail below. A measured volume of mixed color material, i.e. mixture of small diameter crumb rubber, binder and dye, is deposited into the bottom of the mold 20 against the bottom portion 21. The apparatus for providing the desired measured volume of color material is best seen in FIG. 5. The fill tubes 42 are in flow communication with the floor of the mixing tub 37, as shown in FIG. 16, for the color material mixing system 34 and direct a flow of mixed color material to a slidable measuring ring 43. When the measuring ring 43 is in register with the fill tube 42, the mixed color material flows into the measuring ring 43, filling it completely against the floor member 44 with the desired volume of color material. The measuring ring 43 is then is moved along the floor member 44 to an opening 44a therein which is in register with the empty body portion 22 of the mold 20. With this sliding movement of the measuring cup 43, a plate 44b formed as part of the measuring cup 43 slides into position at the bottom of the fill tube 42 to prevent material from spilling out as the measuring cup 43 is moved into register with the opening 44a. The sliding of the measuring ring 43 to the opening 44a dumps the measured color material into the body portion 22 of the mold 20.

The molds 20 are then indexed to the next station, the level color material station 45 where a set of leveling heads 46 are lowered into the mold 20 into engagement with the color material located therein. As depicted in FIG. 6, the leveling heads 46 preferably have a set of downwardly projecting pins 47 that are rotatable preferably at a speed in the range of 50–100 revolutions per minute. The leveling heads 46 are lowered to within about one inch of the bottom floor portions 21 of the respective molds 20 and rotated to effect a leveling of the fluid color material within the mold 20. After a few seconds of operation of the leveling heads 46, the heads 46 are returned to a raised position to permit the further indexing of the molds along the production line 40 to the next station, the fill black material station 48. An alternative embodiment of the leveling head 156 is depicted in FIG. 6a. The downwardly projecting pins 157 are substantially shorted as compared with the embodiment of FIG. 6. Superior leveling results have been obtained by lowering the leveling blade 158 into the upper surface of the material deposited in the mold 20 with the pins 157 extending downwardly into the material. A spring 159 interconnecting the motor 46a and the vertical shaft 159a of the leveling head 156 allows the leveling head 156 to deflect laterally slightly in case the mold 20 is not properly aligned with the leveling head 156.

Assuming that the paving blocks 10 are to be formed as described above with a smooth (and more costly) color material at the top surface 12 and the coarse black material forming the textured bottom surface 15, the fill black material station 48 is used to introduce the coarse black material, i.e. a mixture of the larger diameter crumb rubber and binder, into the mold 20 on top of the color material already in the mold 20. One skilled in the art will readily realize that the paving block 10 is being formed upside down in the mold 20 with the top surface 12 being formed by the bottom floor portion 21 of the mold 20. The fill black material station 48 is constructed identically to the fill color material station 41 shown in FIG. 5 with fill tubes 42 bringing a measured volume of black material into the mold 20 on top of the color material already leveled in the mold 20. The vertical height of the measuring ring 43 for the black material will preferably be greater than the height of the measuring ring 43 for the color material, so as to provide a larger volume of black material than color material for the paving block 10, but otherwise the measuring ring 43 for the black material operates identically to the measuring ring 43 for the color material.

Figure 5A:
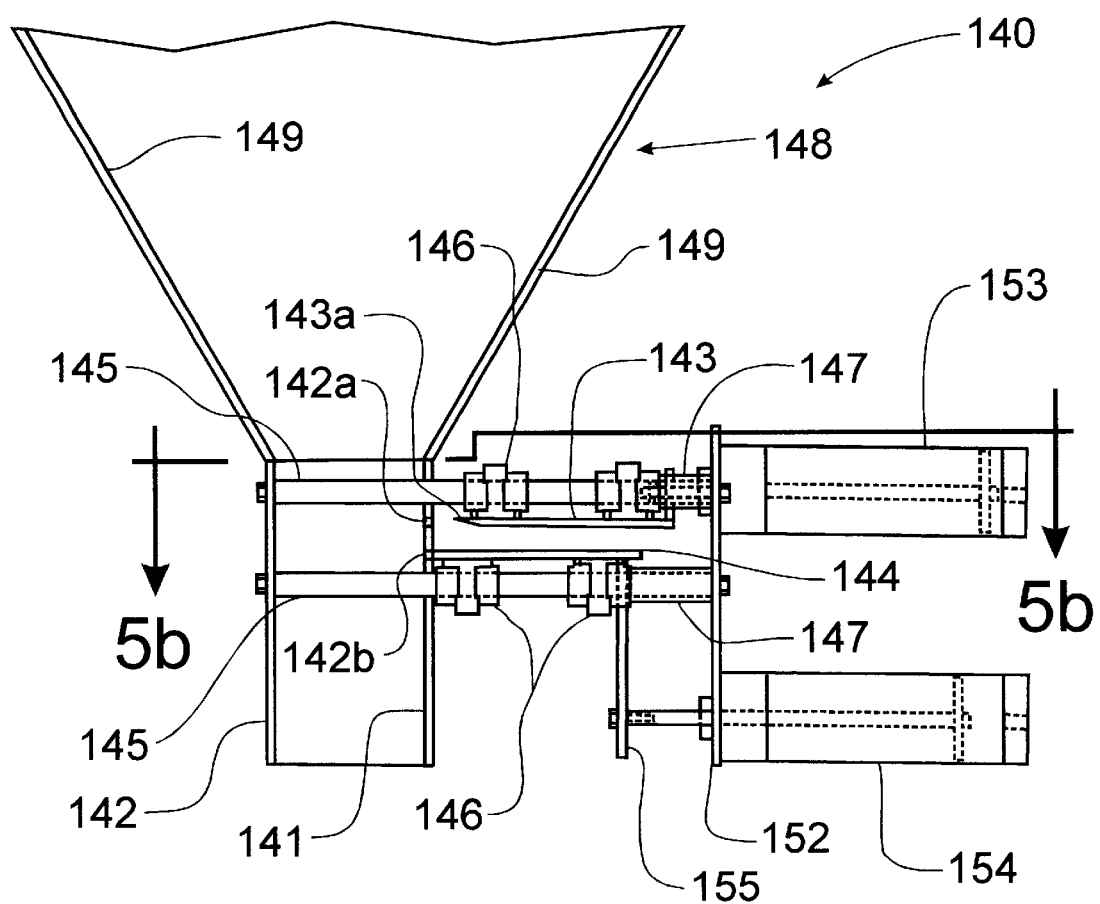
FIG. 5a is an elevational view of an alternative material dispensing apparatus for use in the fill material stations in place of the device depicted in FIG. 5.
Figure 5B:
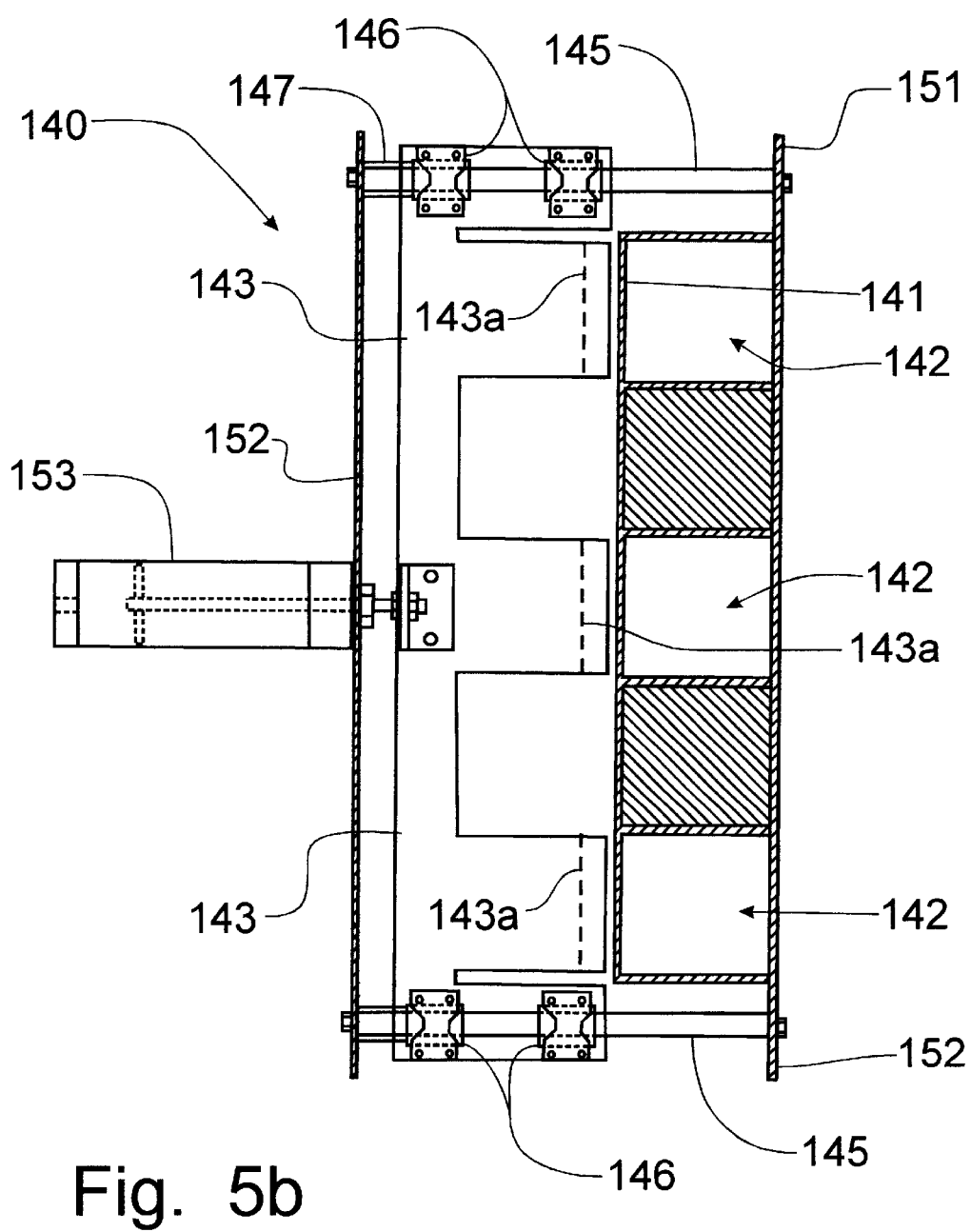
FIG. 5b is a cross-sectional view of the alternative material dispensing apparatus taken along lines 5b—5b of FIG. 5a to provide a plan view of the apparatus.

Referring now to FIGS. 5a and 5b, an alternative embodiment of the fill material stations 41, 48 can best be seen. While the embodiment of the fill tubes 42 and measuring ring 43 described above provided proper measurement and dispensing of requisite amounts of the respective color and black materials to the molds 20, the measuring ring 43 can suffer from a problem associated with the material sticking to the interior of the measuring ring 43 and building up over the course of the day. Such build-up will adversely alter the accuracy of the measurement of the material being dispensed to the molds 20, but also can result in the measuring ring 43 tightly sticking to the fill tube 42 if left overnight in a position in register with the fill tube 42 without having received a thorough cleaning.

Accordingly, a preferred alternative fill material station 41, 48 apparatus 140 is depicted in FIGS. 5a and 5b. The apparatus 140 includes a hopper 148 having sloped outer walls 149 to receive mixed material from the mixing tubs 37 of the respective mixers 34, 35 and to funnel the mixed material into a dispensing box 142. As described above, the dispensing box 142 is preferably configured with three dispensing boxes 142 that will align with the three transverse molds 20 being indexed along the production line 40. Preferably, each dispensing box 142 will be provided with a separate hopper 148 being filled from the corresponding openings in the floor of the mixing tubs 37. Alternatively, the hopper 148 can funnel material into all three dispensing boxes with the blank spaces between the dispensing boxes 142 being fitted with sloped caps (not shown) to direct the material into the dispensing boxes 142. While plastics and coated materials have been tried with varying degrees of success, the best material found to date for constructing the hopper 148 and dispensing boxes 142 is wood.

Each dispensing box 142 is provided with a slot 142a in a transversely extending wall, such as the rear wall 141, through which a measuring plate 143 can pass from externally of the dispensing box 142. The measuring plate 143 is provided with a beveled edge 143a to serve as a cutting edge for dividing the material as will be described in greater detail below. A predetermined distance below the measuring plate 143, a second slot 142b is provided in the rear wall of the dispensing box 142 for the passage of a dispensing plate 144. The volume of the dispensing box 142 between the measuring plate 143 and the dispensing plate 144 equals the volume of the particular material to be dispensed into the molds 20. Preferably, the plates 143, 144 are each supported by slide bearings 146 mounting on slide rods 145 positioned on the exterior opposing sides of the dispensing boxes 142 so that material within the hoppers 148 and the dispensing boxes 142 will not come into contact with the slide rods 145 to interfere with the smooth operation thereof. Operative power for movement of the plates 143, 144 is preferably provided by pneumatic cylinders 153, 154 fixedly supported for operative registry with the corresponding plate 143, 144.

The dispensing plate 144 must be adjustable vertically within the dispensing box 142 to permit a variation in the amount of material being dispensed into the molds 20. Several configurations can be utilized to permit relocation of the lower slot 142*b*, including the formation of a plurality of slots 142*b* within the rear wall 141 with plugs filling the unused slots, or providing a replacement panel (not shown) for the rear wall 141 below the upper slot 142*a* to locate the lower slot 142*b* at the proper position for determining the volume of material to be dispensed. Preferably, the slide rods 145 are mounted in slots (not shown) formed within the support members 151, 152 fore and aft of the slide rods 145 to facilitate this vertical adjustment. Furthermore, the dispensing plate 144 preferably incorporates a depending actuation arm 155 that is connected with the pneumatic cylinder 154 through a slotted opening (not shown) that allows the dispensing plate 144 to be moved vertically without having to re-position the pneumatic cylinder 154.

Fore and aft movement of the plates 143, 144 are powered by the pneumatic cylinders 153, 154, but are limited in return by stop bumpers 147 detachably mounted on the slide rods 145. Forward motion of the plates 143, 144 is limited by the stroke of the pneumatic cylinders 153, 154. The length of the stop bumpers 147 determines the return position of the plates 143, 144 without regard to the stroke of the cylinders 153, 154. Preferably, the measuring plate 143 is stopped completely outside of the dispensing box 142 so that the slot 142*a* will clean the beveled edge 143*a*. The dispensing plate 144 need only stop at the slot 142*b* because the dispensing plate 144 is never used to cut through the material being dispensed. One skilled in the art will realize that multiple pneumatic cylinders 153, 154, can be provided if necessary for larger configurations to keep the transverse length of the plates 143, 144 properly moving into the dispensing boxes 142; however, in the depicted configuration corresponding to three molds 20 being transversely spaced on the production line 40, one cylinder 153, 154 at each plate 143, 144 has been found to be adequate.

In operation, both of the plates 143, 144 can be fully inserted into the dispensing boxes 142 through the properly located slots 142*a*, 142*b*. The hopper (or hoppers) 148 is filled with mixed material from the mixing tub 37 to fill the hopper 148 and each dispensing box 142 from the measuring plate 143 upwardly. The first charge of material is dropped against the dispensing plate 144 by the withdrawal of the measuring plate 143 from the dispensing box 142 to fill the dispensing boxes 142 from the dispensing plate 144 upwardly. The measuring plate 143 is then re-inserted through the slot 142*a* into the dispensing box 142 with the beveled edge cutting through the mass of material within the dispensing box 142 and shutting off the flow of material from the hopper 148 to the dispensing plate 144. The volume of material within the dispensing box 142 between the measuring plate 143 and the dispensing plate 144 being the selected amount of material to be deposited into the molds 20, the dispensing plate 144 is then retracted from the dispensing box 142 to allow the measured volume of material to fall into the mold 20 positioned immediately below the dispensing box 142. Optionally, a flexible guide (not shown) might be utilized to prevent bounce of material from the mold 20.

The dispensing process is then repeated by re-inserting the dispensing plate 144 through the slot 142*b* into the dispensing box 142 and then subsequently retracting the measuring plate 143 to allow material flow from the hopper 148 to fill the dispensing box 142 to the dispensing plate 144. The re-insertion of the measuring plate 143 into the dispensing box 142 allows the subsequent retraction of the dispensing plate 144 to drop the requisite volume of material into the next mold 20 positioned below. Removal of the stop bumpers 147 at the end of the production day allows both of the plates 143, 144 to be completely retracted from the dispensing boxes 142 for ease of cleaning.

Following the introduction of the black material into the mold 20, the molds 20 are then indexed to the next station on the production line 40, the level black material station 49. As with the color material leveling station 45, the black material leveling station 49 involves the lowering of leveling heads 46 into the black material. The difference between the operation of the level color material station 45 and the level black material station 49 is the depth to which the pins 47 are lowered into the fluid material within the mold 20. Instead of lowering the pins 47 to within an inch of the bottom floor portion 21, the pins 47 are lowered to a position that terminates about an inch from the top of the mold 20, in other words, the pins 47 are only inserted a slight distance into the black material. As noted above, a rotation of the leveling heads 46 will then level the fluid black material within the mold 20, whereupon the molds 20 can then be indexed to the next station, the install lid station 50. Preferably the leveling heads 46 at the two leveling stations 45, 49 are identical except for the positioning of an adjustable stop mechanism 46*b* that determines the depth of insertion of the pins 47 into the mixture.

As will be noted below, the lid 24 had been placed in front of the body portion 22 of the mold 20 as part of the process of removing the paving block 10 from the mold 20. Accordingly, the indexing of the mold 20 from one station to the next by the indexing apparatus 22 described in greater detail below results in the body portion 22 pushing the lid 24 in front thereof from one station to the next, until reaching the install lid station 50. A guide device 52*a* in the form of downwardly depending rods aligns the lid 24 in a desired orientation before being engaged by the pneumatic lid lifting mechanism 51 best seen in FIG. 7. The pneumatic lid lifting mechanism 51 is constructed with a radially expandable balloon 52 that is positionable within the tubular columnar member 28 of the lid 24. The injection of air into the inflatable balloon 52 expands the balloon 52 tightly against the interior surface of the columnar member 28 to permit the lid lifting mechanism 51 to vertically and horizontally move the lid 24. The guide rods 52*a* protect the balloon 52 as the lifting mechanism 51 is inserted into the lid 24.

The lid lifting mechanism 51 is supported on a longitudinally movable track 53 that enables the lid lifting mechanism 51 to move longitudinally relative to the mold 20. The movement of the track 53 is powered by a cylinder 54, which is preferably hydraulic, but could be pneumatic. Once the lid lifting mechanism 51 has engaged the lid 24, the pneumatic lifting cylinder 55 raises the lid 24 and the engaged lid lifting mechanism 51 above the level of the mold 20, while the cylinder 54 translates the track 53 longitudinally so the lid 24 becomes oriented over the body portion 22 of the mold 20. The guide members (not shown) then adjust the orientation of the body portion 22 to conform to the orientation of the lid 24 while the cylinder 55 lowers the lid into the body portion 22 of the mold 20. A release of the pneumatic pressure within the balloon 52 allows the balloon 52 to relax so the lid lifting mechanism 51 can be raised vertically to a home position while leaving the lid 24 within the body portion 22 of the mold 20.

To control the depth at which the lid lifting mechanism 51 is lowered, a bracket 56 is provided to engage a nut 55*a* on the end of the lifting cylinder 55 to stop the movement of the lifting cylinder 55 at the proper location to engage the columnar portion 28 of the lid 24 when located on the body portion 22. When the lid lifting mechanism 51 has been translated forwardly of the body portion 22 to engage the lid 24 forwardly of the body portion 22, the bracket 56 no longer is engageable with the nut 55a and the cylinder 55 can move its full stroke to engage the lid 24 at a lower position on the rails 81.

With the lid 24 positioned within the body portion 22 of the mold 20, the mold 20 can then be indexed to the next station, the latch press station 57 shown in FIG. 8. At the latch press station 57, a press plate 58 is located above the mold 20 with the lid 24 positioned with the upright columnar member 28 projecting above the body portion 22. The press plate 58 presses down on the columnar member 28 to compress the material between the lid 24 and the bottom portion 21. Nuts 58a form adjustable stops for the press plate 58 to provide a physical stop for the positioning of the press plate 58 relative to the columnar member 28. The crumb rubber and binder mixture is compressible; however, the crumb rubber still retains an elastic memory. Therefore, the lid 24 must be latched into the compressed orientation until the elastic memory is lost through the curing process.

Figure 9A:
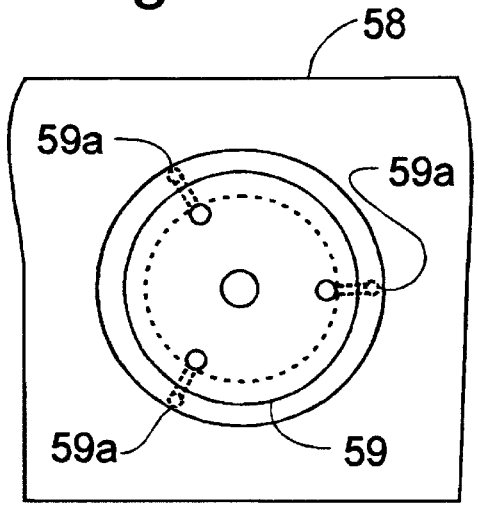
FIG. 9a is bottom plan view of the pneumatic latch press member taken from the perspective of the mold in FIG. 9.
Figure 9:
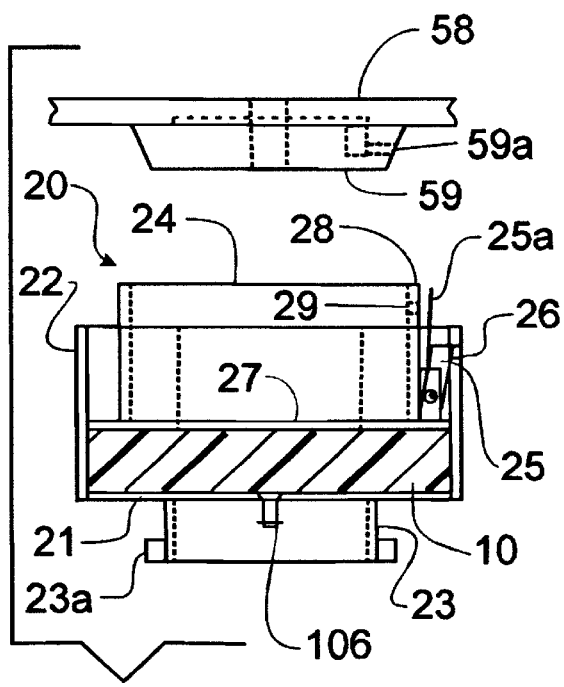
FIG. 9 is an enlarged schematic elevational view of the mold and the pneumatic latch press member operable to engage the lid latches with the corresponding holes in the mold body at the latch press station.
Figure 10:
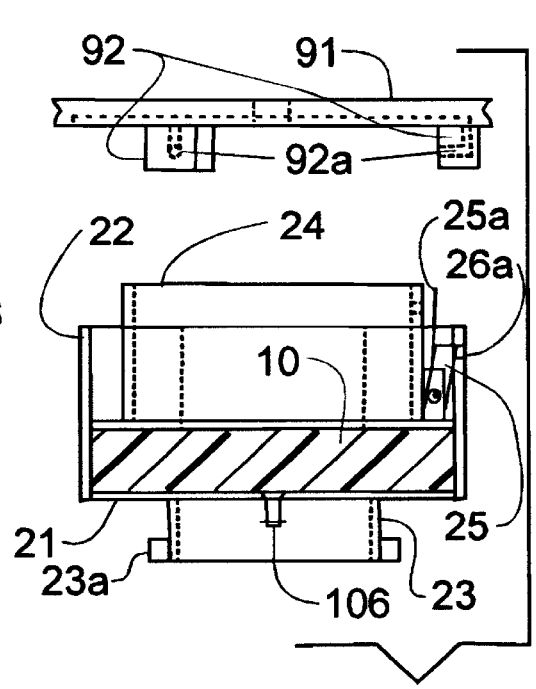
FIG. 10 is an enlarged schematic elevational view of the mold and the pneumatic unlatch member operable to effect a disengagement of the lid latches from the corresponding holes in the mold body at the unlatch press station.

To accomplish the latching of the lid 24, the press plate 58 is provided with a pneumatic latch insert member 59, best seen in FIGS. 9 and 9a, that is positioned within the upright columnar member 28. A blast of compressed air from the passageways 59a within the latch insert member 59 through holes 29 in the upright columnar member 28 pivotally moves the latches 25 outwardly away from the columnar member 28 into engagement with the latch holes 26 in the body portion 22, whereupon the press plate can be withdrawn while the latches 25 hold the lid 24 into a position that compresses the material within the mold 20.

Figure 11:
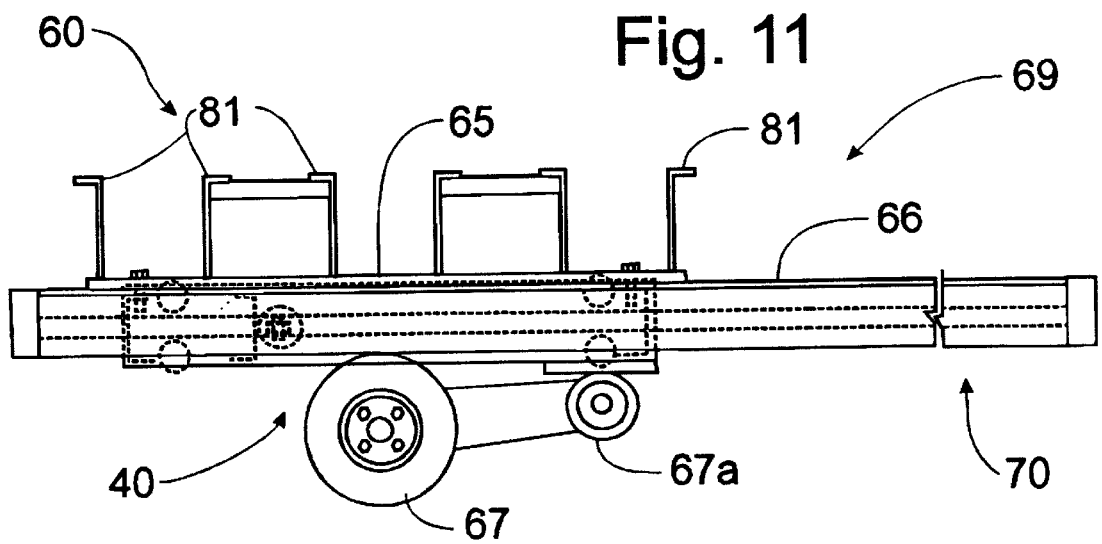
FIG. 11 is an end elevational view of the back end transfer station from transferring molds from the production line shown in FIG. 3 to the oven line shown in FIG. 2, the transfer station at the front end transferring molds from the oven line to the production line being substantially the mirror image.
Figure 12:
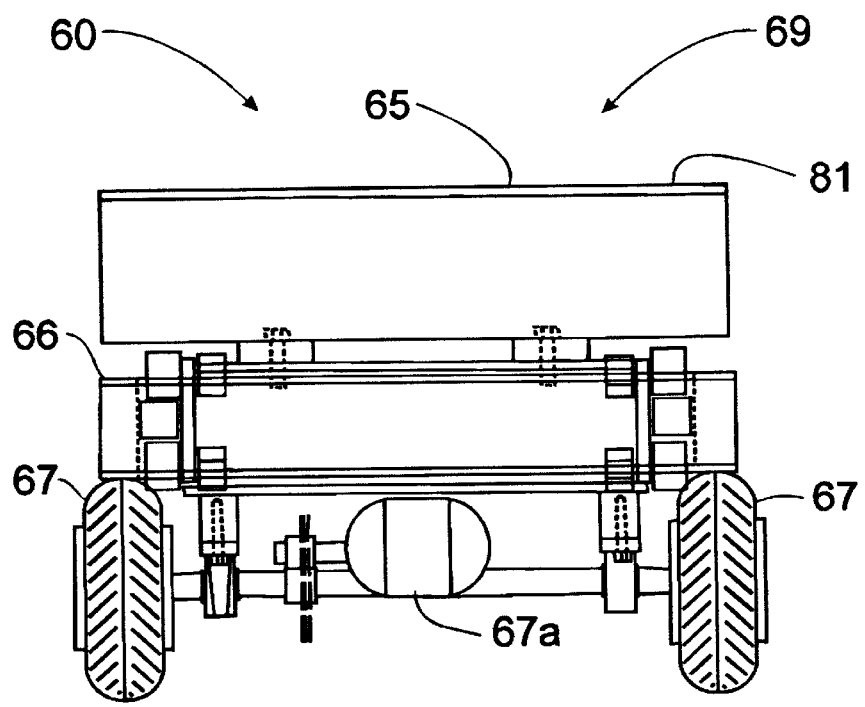
FIG. 12 is an enlarged schematic side elevational view of the transfer station shown in FIG. 11.

The mold 20 is now positioned for placement into the oven line 70. An end transfer mechanism 60 moves the three molds 20 being indexed from the latch press station 57 into the oven line 70. The end transfer mechanism 60, shown in FIGS. 3, 11 and 12, includes a first longitudinally reciprocable blade member 62 that is positionable behind the molds 20 at the end of the production line 40 and pushes the molds 20 onto a transfer truck 65 that shuttles transversely between the ends of the production line 40 and the oven line 70. The first blade member 62 is both vertically and horizontally movable to be positionable behind the abreast set of molds 20 to push them onto the truck 65. The truck 65 travels over a track 66 and is powered preferably by an electric motor 67a rotatably driving a pair of wheels 67. Once the truck 65 and its cargo of three molds 20 have been transferred to the beginning end of the oven line 70, a longitudinally reciprocable second blade member 68 pushes the molds 30 off the truck 65 onto the end of the oven line 70. Preferably, the second blade 68 is pivotally mounted to retract as the second blade member 68 moves toward the truck 65 to slide over any objects that might be accidentally on the truck 65; however, under normal circumstances, the second reciprocal blade 68 will not need to move vertically over any objects.

The oven line 70, shown in FIGS. 2 and 4, includes an oven portion 71 having an upper heated air plenum 72 and a lower heated air plenum 73 directing the flow of hot air directly onto the molds 20 in the oven portion 71 of the oven line 70. Preferably, the oven portion 71 is sufficiently long to house ten rows of molds 20. Each plenum 72, 73 is preferably constructed to have an opening (not shown) directly in line with the molds 20 in each row within the oven portion 71 to direct the flow of heated air immediately onto each mold 20 equally. The heated air is provided by a furnace 75, such as a high BTU gas furnace with a variable control for firing the furnace 75 and is blown into the plenums by the fan 76. In the event, either the production line 40 or the oven line 70 breaks down, or in the event the temperature of the molds 20 gets too high, the gas furnace 75 needs to have an adjustment as to the amount of heat being produced thereby and blown into the oven portion 71.

Following the oven portion 71 is the cool down portion 77. Preferably, the temperature of the exterior surface of the molds 20 will reach a temperature of approximately 200–300 degrees, which should require the temperature of the oven portion to be in the range of 450 to 650 degrees, depending on the temperature of the molds 20 entering the oven portion 71. A thermocouple positioned within the return air vent 78 will provide an acceptable response time for the control of the firing of the furnace 75 by sensing the temperature of the return air. Preferably, at least one sensor, possibly an infra-red sensor, will be positioned early in the cool down portion 77 of the oven line 70 to sense the temperature of the outside surface of the molds 20 as they exit the oven portion 71 in order to provide additional input as to the operation of the oven line 70.

The firing of the furnace 75 is significantly dependant on the temperature of the molds 20 entering the oven portion 71. If the molds 20 are permitted to cool down appreciably below 200 degrees before entering the oven portion 71, the amount of energy to raise the temperature of the mold 20 to the desired temperature. This energy drop will result in a lowering of the temperature of the return air and an automatic manipulation of the variable furnace controls to increase the temperature of the air moved into the plenums 72, 73. If the second return air vent 79 is utilized, appropriate correction for the temperature differential would have to be made with respect to the automatic control of the furnace 75.

One skilled in the art will recognize that the heating of the crump rubber and binder mixtures will hasten the curing of the mixture and cause the crumb rubber to lose its elastic memory and be re-set at the shape of the compressed paving block shape induced by the mold 20. If the temperature of the mold 20 is too high, the mixture will "cook" instead of cure, causing the binder to crumble when the paving block 10 is taken from the mold 20 or placed under stress in use. Preferably, the molds 20 will not cool down below about 200 degrees as they exit the end of the cool down portion 77 of the oven line 70. Since there is no human interaction with the production line 40, there is no need in drastically cooling the molds 20. In fact, there is a benefit in not cooling the molds 20 much at all, as the higher the temperature of the molds are in the production line 40, the less fuel will be required at the furnace to heat the molds 20 back up to the 300 degree surface temperature.

The cool down portion 77 of the oven line 70 is also associated with the return air vents for the heated air blown into the oven portion 71. At least one return air vent 78 is in flow communication with the cool down portion 77 to return air back to the furnace 75 to be re-heated and blown back into the oven portion 71 by the fan 76. An optional second return air vent 79 may be added along the cool down portion 77 further remote from the oven portion 71 to provide a greater control over the temperatures within the cool down portion 77. By manipulating conventional baffles (not shown) within the return air vents 78, 79, the temperature of the cool down portion 77 could be manipulated in a desired manner to maintain a higher temperature of the molds 20 or to allow them to cool down further. Additional sensors (not shown) could be provided along selected places in the cool down portion 77 to provide input on the temperature of the outer surface temperature of the molds 20 throughout the cool down portion 77.

Preferably the entire oven line 71 is insulated and provides a linear chamber through which the molds 20 are conveyed from the first end transfer station to the second end transfer station 69 which operates in the same manner as the first end transfer station 60 to transfer the set of three molds 20 together from the end of the cool down portion 77 of the oven line 70 to the beginning of the production line 40 where the cured paving block 10 will be removed from the mold 20 and then refilled with crumb rubber and binder mixture, as described above, to provide a continuous process.

Referring now to FIGS. 2, 3, 7, 8, 13 and 14, the conveying mechanism 80 for indexing the molds 20 from one station to another can be seen. The molds 20 ride on respective transversely spaced apart rails. 81 throughout the production and oven lines 40, 70, except at the end transfer stations 60, 69. The bottom portion 21 of the molds 20 has a generally rectangular conveying ring 23 affixed to the underside thereof to project downwardly therefrom between the rails 81. The conveying ring 23 is provided with fore-and-aft extending lugs 23a for use as described in greater detail below in the production line 40. Between the respective sets of rails 81 on the production line 40 and below the molds 20, a pair of elongated bars 83 extend the entire length of the production line 40. Each of the elongated bars 83 carries a dog 85 pivotally mounted on the bar 83 for each station of the production line 40. The dogs 85 are mounted in corresponding pairs, one pair of dogs 85 for each respective station. Each dog 85 is co-operable with a stop 86 to prevent the dog 85 from pivoting rearwardly, but allowing the dog 85 to pivot forwardly.

A hydraulic cylinder 88 is coupled to the elongated bars 83 and is operable to reciprocate the bars 83 in a longitudinal direction. The pair of dogs 85 engage the conveying ring 23 of the mold 20 and, because the stops 86 prevent the dogs 85 from pivoting rearwardly, the dogs 85 push the mold 20 forwardly along the rails 81 to the next station with the stroke of the hydraulic cylinder 88. The reverse stroke of the hydraulic cylinder 88 returns the dogs 85 to the home position for their respective station, pivoting forwardly to pass beneath the conveying ring 23 of the molds 20 moved into that station by the dogs 85 of the previous station. By this manner, the molds 20 are indexed from one station to another along the production line 40. Preferably, the molds 20 are spaced at greater intervals in the production line 40 than in the oven line 70, thereby requiring a larger stroke of the hydraulic cylinder 88, or a linkage (not shown) to provide the proper length of movement required for each indexing of the molds 20 on each stroke of the hydraulic cylinder 88.

The oven line 70 is set up in the same manner, except that the dogs 85 are spaced at intervals to minimize the spacing therebetween while in the oven line 70. Therefore, the stroke of the hydraulic cylinder 89 for the oven line 70 will be smaller than the hydraulic cylinder 88 in the production line 40 to index the molds 20 along the oven line 70. For proper timing of the operation of the end stations 60, 69, the indexing of the molds 20 on both the production and oven lines 40, 70 needs to be accomplished simultaneously. Each station on the production line 40 will be equipped with a ready switch (not shown) to indicate that the activity to be accomplished at that station has been completed.

A programmable logic controller (PLC) receives input from each of the ready switches and from the temperature sensors to control the operation of the conveying mechanism 80 and the variable control of the furnace 75. The PLC will be set to index the molds 20 at a predetermined interval of time, for example every 20 seconds, which will provide sufficient time in the oven portion 71 to heat the molds 20 therein. The PLC will not effect the actuation of the hydraulic cylinders 88, 89 to index the molds 20 to the next station unless each of the ready switches have been activated during that particular interval. In the event, all of the ready switches have not been activated, the PLC will control the operation of the furnace 75 such that the temperature of the molds 20 will not rise to high, to the point that the furnace can be shut down entirely.

The end transfer stations 60, 69 must also be operated in conjunction with the indexing of the molds 20 along the production and oven lines 40, 70. When the molds 20 have been indexed to the very end of the production line 40, a switch (not shown) is activated to start the end transfer apparatus 60, starting first with the positioning of the first transfer blade 62 behind the molds 20 to push them onto the transfer truck 65. The beginning of the oven line 70 is empty because the molds that had been previously placed there had been indexed into the oven portion 71 with the last movement of the conveying mechanism 80.

Simultaneously, the end transfer mechanism 69 between the end of the oven line 70 and the beginning of the production line 40 is actuated to convey the sets of molds 20 to the beginning of the production line 40, which is also empty due to the indexing of the molds 20 previously transferred there to the first station of the production line 40. Accordingly, while the respective activities at the various stations on the production line 40 are occurring, the end transfer mechanisms 60, 69 effect the transfer of molds from the end of one line to the beginning of the other line. A ready switch (not shown) also signals the PLC that the transfer operation has been completed, as with the other stations of the production line 40.

After being transferred from the oven line 70 to the beginning of the production line 40, the molds are then indexed at the next interval to the first station of the production line 40, the unlatch press station 90. By this time, the paving block 10 within the mold 20 has been heated and cured and the paving block 10 will retain its shape due to the newly established elastic memory of the crumb rubber within the paving block 10. As best shown in FIGS. 10 and 10a, the unlatch press station 90 moves a second press plate 91, of the same configuration as the first press plate 58, against the upright columnar portion 28 of the lid 24 to slightly compress the paving block 10 and release the stress on latches 25. A pneumatic unlatch member 92, preferably in the form of a downwardly depending post, is attached to the bottom of the second press plate 91 to align with the latch holes 26 in the outer periphery of the body portion 22 of the mold 20. The three spaced posts 92 permit a visual inspection of the latches 25 when the second press plate 91 moves downwardly against the columnar portion 28.

A blast of compressed air from the air holes 92a in the unlatch members 92 against the latches 25 will pivot the latches 25 inwardly against the columnar portion 28 of the lid 24 to release the lid 24 from the body portion 22. Preferably, the latches 25 will be equipped with an actuation tab 25a in the form of a flat piece of metal against which the pneumatic air blasts from both the unlatch member 92 and the latch insert member 59 can work to effect movement of the latches 25 as desired. Once the latches 25 have been released from the body portion 22, the press plate 91 is returned to the home position where the ready switch (not shown) will be activated. The slight decompression of the paving block 10 will move the lid 24 upward slightly so that the latches 25 will not re-engage the latch holes 26 in the body portion 22.

The molds 20 are then indexed to the next station on the production line 40, the remove lid station 93. The pneumatic lid lifting mechanism 94 is identical structurally and operationally to the lid lifting mechanism 51 shown in FIG. 7 and used in the install lid station 50, except the mechanism 51 is used to remove the lid 24 from the boy portion 22 instead of installing it thereon. The lid lifting mechanism 51 is first lowered into the interior of the upright columnar portion 28 of the lid 24 by the lifting cylinder 55 until the nut 55a engages the bracket 56, the balloon 52 is then inflated to engage the columnar portion 28, and the lid 24 is then lifted off of the body portion 22 by the retraction of the cylinder 55. The cylinder 54 can then be actuated to move the track 53 forwardly where the lid lifting mechanism is lowered to position the lid 24 on the rails 81 forwardly of the body portion 22. When the lid lifting mechanism 51 is returned to the home position, the ready switch (not shown) is activated.

Figure 7:
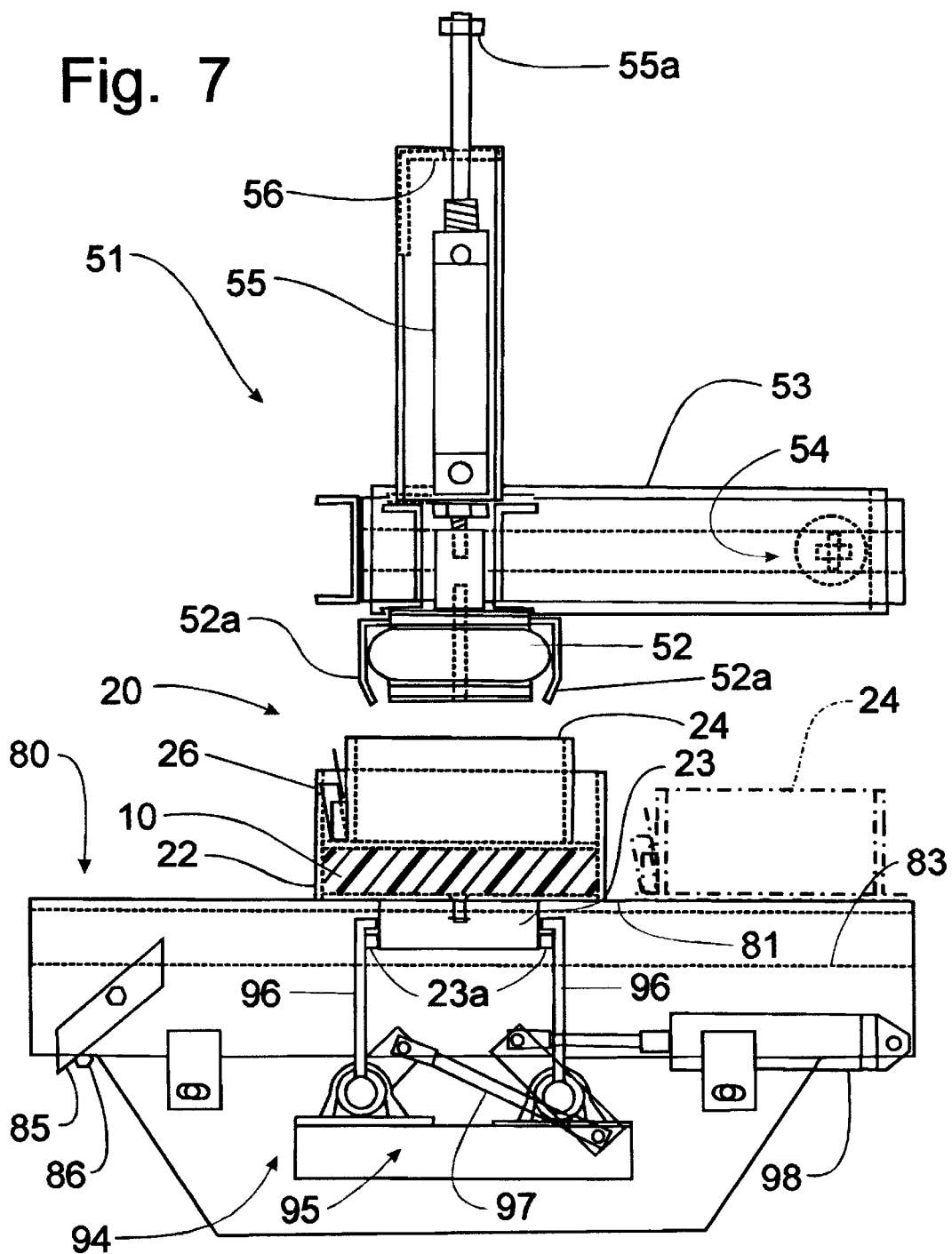
FIG. 7 is an enlarged schematic side elevational view of the apparatus for removing and replacing the lids on the molds at both the install lid station and the remove mold top station of the production line shown in FIG. 3, the lid of the mold being positioned within the mold body, the mold clamping mechanism being actuated to engage the conveying ring of the mold.

To provide resistance to the frictional forces that will be encountered upon the raising of the lid 24 off of the body portion 22 and to break the adhesive forces between the cured paving block 10 and the lid 24, a first mold clamping mechanism 95 grasps the lugs 23a on the conveying ring 23 beneath the rails 81. The first mold clamping mechanism 95 is best seen in FIG. 7. One skilled in the art will readily realize that the first mold clamping mechanism 95 is not needed at the install lid station 50. Since FIG. 7 is used to demonstrate the lid lifting mechanism 51 used at both the install lid station 50 and at the remove lid station 93, FIG. 7 has been drafted to incorporate the first mold clamping mechanism 95.

The first mold clamping mechanism 95 includes a pair of fore-and-aft spaced clamp levers 96 pivotally connected to a linkage 97 operated by a hydraulic or pneumatic actuating cylinder 98. The extension of the actuating cylinder 98 moves the linkage 97 to effect a pivotal movement of the clamping levers 96 to pivot upwardly and clamp the lugs 23a on the fore-and-aft sides of the rectangular conveying ring 23. The first mold clamping mechanism 95 keeps the body portion 22 on the rails 81 while the lid 24 is being raised vertically from the body portion 22. After the lid 24 has been removed from the body portion 22, the actuating cylinder 98 retracts to pivotally retract the clamping levers 96 so that the first mold clamping mechanism 95 will release the conveying ring 23 to permit indexing thereof to the next station, the remove piece station 100.

Since the dogs 85 only push against the conveying ring 23 on the bottom portion 21 of the mold 20, the body portion 22 only is conveyed directly by the conveying mechanism 80. The placement of the lid 24 forwardly of the body portion 22, as depicted in dotted lines in FIG. 7, allows the body portion 22 to push against the lid 24 and move the lid forwardly therewith along the rails 81 immediately adjacent to the body portion 22. To keep the lid 24 on the rails 81 in proper position forwardly of the body portion 22, the underside of the lid 24 may be equipped with guide bolts (not shown) that ride inside of the rails 81 to keep the lid 24 in proper alignment. The guide bolts (not shown) will further help provide the textured shape to the bottom surface 14 of the paving block 10.

Figure 13:
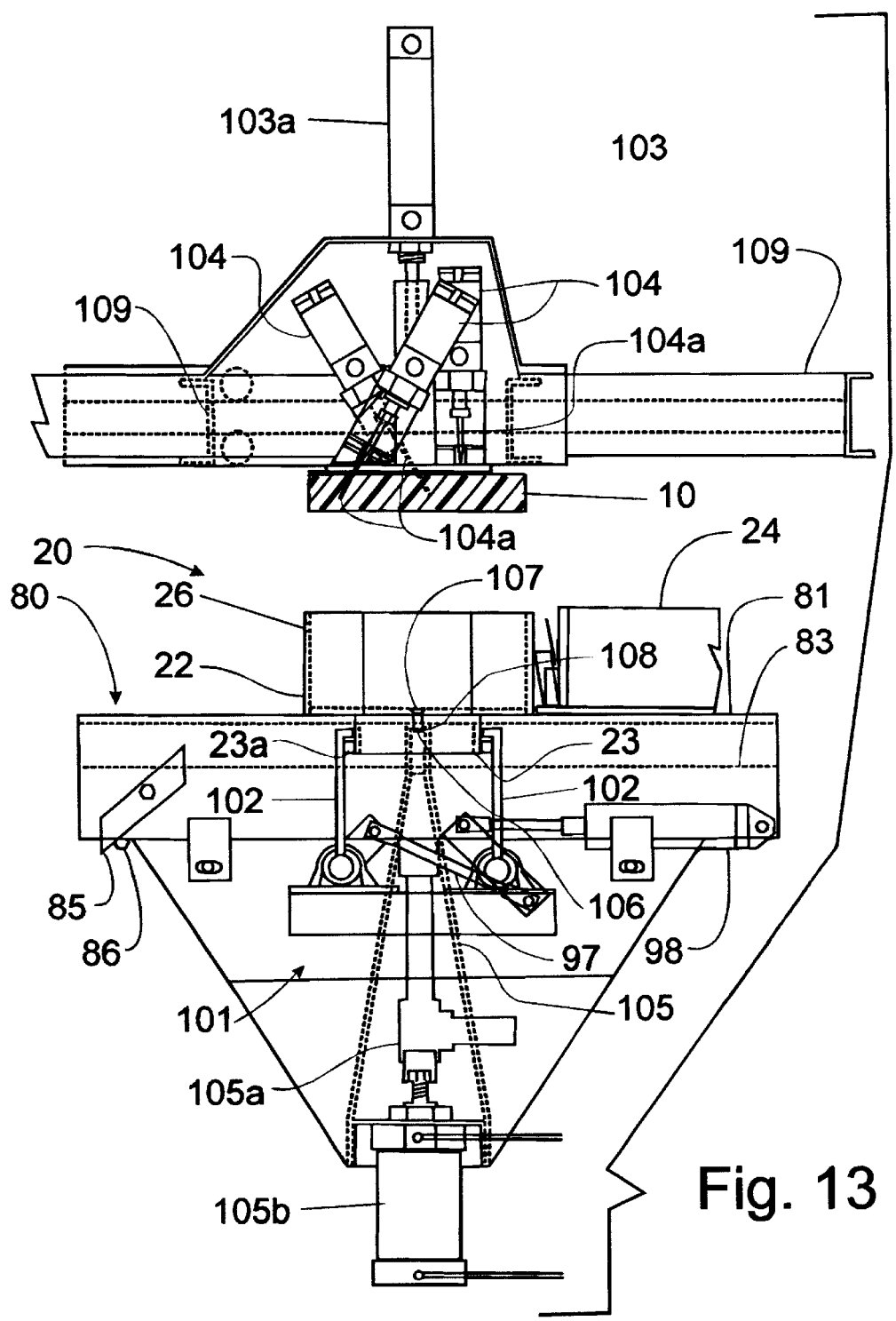
FIG. 13 is an enlarged schematic side elevational view of the apparatus at the remove production piece station of the production line shown in FIG. 3, the production piece being removed from the mold and supported by the piece holding mechanism above the mold, the mold lid not being depicted for purposes of clarity.
Figure 14:
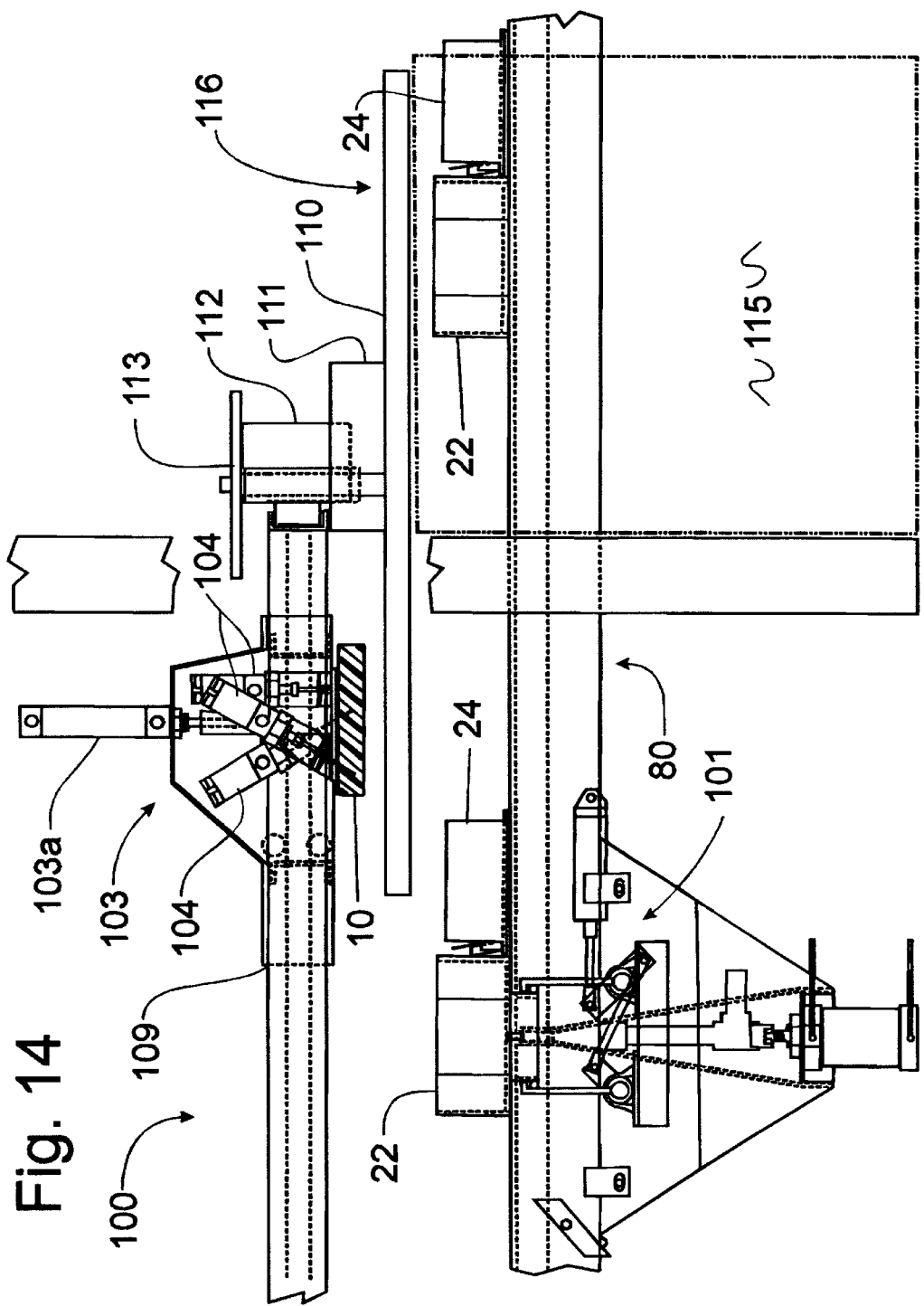
FIG. 14 is a schematic side elevational view of the remove piece station and the adjacent turntable with the piece holding mechanism being moved longitudinally of the position shown in FIG. 13 to the release position above the turntable.

At the remove piece station 100, depicted in FIGS. 13 and 14, a second mold clamping mechanism 101 having clamping levers 102 pivotally connected to the linkage 97 that is operated by the extension and retraction of an actuating cylinder 98. Preferably, both the first and second mold clamping mechanisms 95, 101 are operated simultaneously by the actuating cylinder 98 to clamp the molds 20 at both the remove lid station 93 and the remove piece station 100; however, separate cylinders 98 could also be provided, as is generally depicted in the drawings. As with the removal of the lid 24, the removal of the formed paving block 10 requires the breaking of adhesive and frictional forces between the formed paving block 10 and the body portion 22 of the mold 20. For these reasons, the body portion 22 must be held down against the rails 81 by the second mold clamping mechanism 101.

With the lid 24 removed from the body portion 22, the top of the formed paving block 10, which is actually the textured bottom surface 14, is exposed for engagement with a piece holding mechanism 103, which comprises several (preferably three) angled cylinders 104, each having a retractable pin 104a that can be projected into the formed paving block 10. The angled cylinders 104 could be pneumatic or hydraulic cylinders or electric solenoids as the only function of the cylinder 104 is to extend the retractable pins 104a into the paving block 10. Preferably, the cylinders 104 are each angled at an angle of about 30 degrees to provide a vertical force component on the paving block 10, for reasons that will be noted below. Upon reaching the remove piece station 100, the piece holding mechanism 103 is lowered into the body portion 22 of the mold 20 against the formed paving block 10 whereupon the pins 104a are injected into the paving block 10.

While the piece holding mechanism 103 is lowering and injecting into the paving block 10, a pneumatic tube 105 is raised upwardly from below the mold 20 into engagement with the lower surface of the bottom portion 21 of the mold 20. The bottom floor portion 21 of the mold 20 is formed with a pop valve 106 projecting through a hole in the center of the bottom floor portion 21. The pop valve 106 has a head 107 that is formed to cover the hole in the bottom portion 21 and remain flush with the top surface of the bottom floor portion 21 so that the top surface 12 of the paving block 10 that is formed thereagainst is smooth and unmarked. The pop valve 106 also has an enlarged portion 108 below the bottom portion 21 of the mold 20 so that the pop valve 106 cannot be moved completely through the mold 20.

When the pneumatic tube 105 has engaged the lower surface of the bottom portion 21 of the mold 20 and the retractable pins 104a are injected into the paving block 10, the lift cylinder 103a is activated to place a light lifting load on the paving block 10 by the piece holding mechanism 103. A flow of compressed air at a sufficient pressure to effect a raising of the block 10 is directed into the body portion 22 through the pop valve 106 against the smooth uniform top surface 12 of the paving block 10. The compressed air spreads against the surface 12 of the paving block 10 to provide a adequate lifting force to move the paving block 10 vertically out of the body portion 22, pushing the piece holding mechanism 103 vertically with the paving block 10. When the paving block 10 has been raised to the point of clearing the body portion 22, the lift cylinder 103a continues the upward lifting force exerted on the block 10 to continue the lifting of the paving block 10 vertically above the mold 20.

Figure 15:
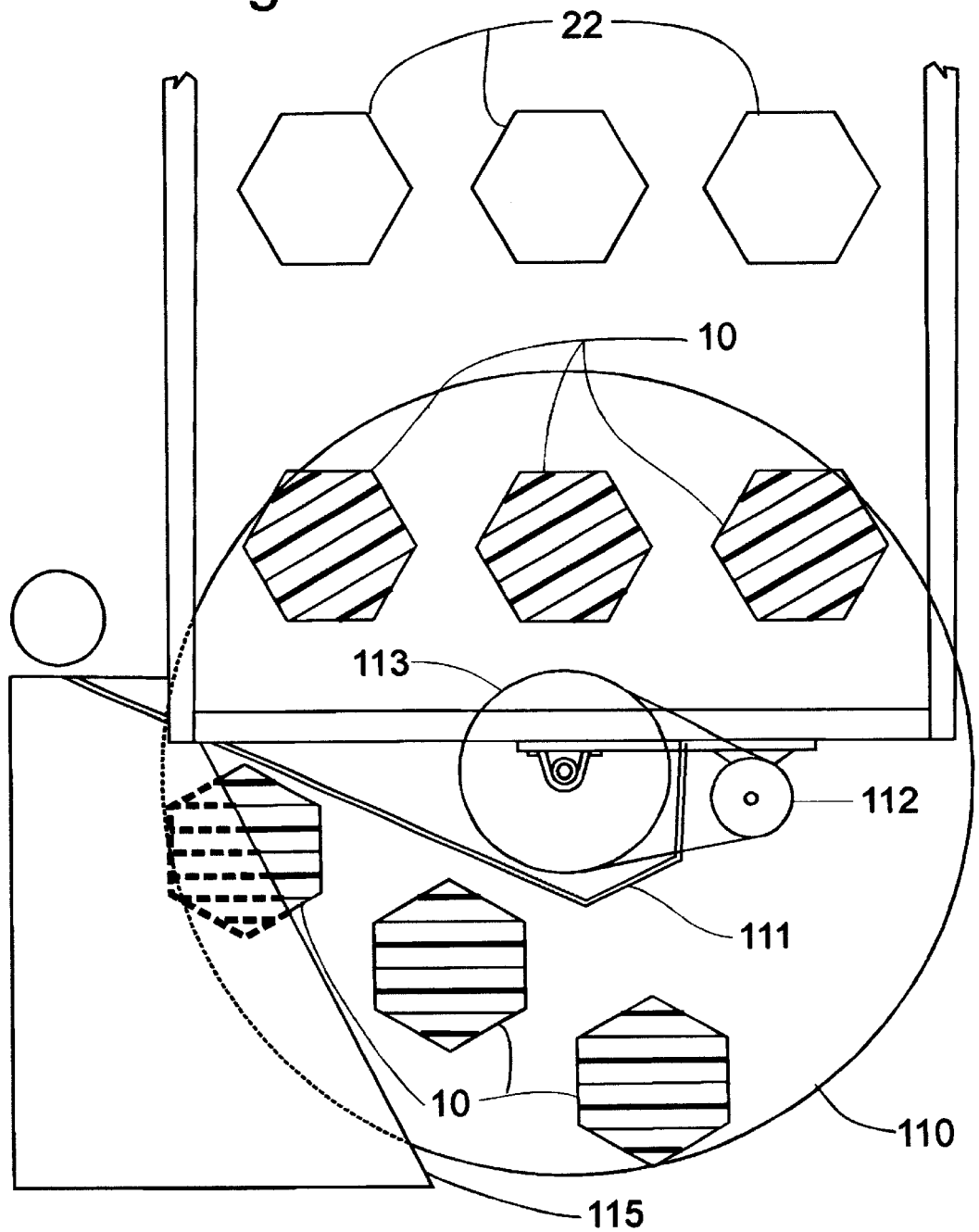
FIG. 15 is an enlarged top plan view of the turntable takeoff station of the production line shown in FIG. 3.

Each of the three (preferably) piece holding mechanisms 103, oriented transversely to correspond to the three abreast molds 20, is provided with its own ready switch, so that the PLC will not be allowed to index the molds to the next station until all of the paving blocks 10 have been removed from the body portion 22. Because of the variation in applicable adhesive and frictional forces, the paving blocks 10 may not all be released from the mold 20 simultaneously and the molds 20 cannot be allow to index to the next station until the molds 20 have been emptied. Once all of the paving blocks 10 have been removed from the respective molds 20, the piece holding mechanism 103 can be moved forwardly on a track 109 by a cylinder (not shown) until the removed paving blocks 10 are positioned above a turntable 110 that is continuously rotated at about 10 RPM by an electric motor 112 powering the rotation of a drive pulley 113 through a drive belt. The turntable takeoff station is shown in FIGS. 14 and 15.

Once over the turntable 110, the pins 104a can be retracted into their respective cylinders 104 to release the paving blocks onto the turntable 110 which rotates the released paving blocks against a push-off bar 111 that pushes the paving blocks onto a collection mechanism 115. It has been found that the placement of a conveyor (not shown) in the collection bin 115 at the proper vertical height below the turntable 110 will allow the paving blocks 10 to tumble exactly one-half of a revolution to land on the conveyor (not shown) with the smooth top surface 12 facing upwardly for inspection and packing by separate mechanism or manual operation at a remote site.

After releasing the paving blocks 10 onto the turntable 110, the piece holding mechanism 103 is returned to a home position above the molds 20 in the remove piece station 100 to engage a ready switch to permit the indexing of the now empty molds 20 to the next station 116, which is beneath the turntable 110. The next station 117 is also an empty station while the molds 20 are awaiting further indexing to the next station, which is the fill color material station 41 described above. Since the turntable 110 is located above the molds 20 on the production line 40, and specifically above the empty station 116, the mold 20 cannot be filled with material until advanced where the fill tubes 42 can be accessed in a convenient and effective manner. The placement of the empty station 117 allows for possible expansion of another function into the production line 40 before starting the process all over again at the fill color material station 41.

One skilled in the art will readily recognize that various components will be made adjustable to accommodate tolerances and to account for wear. For example, the nut 55a on top of the cylinder 55 for the lid lifting mechanisms 51, 94 is adjustable along a threaded portion of an adjustment rod sticking upwardly from the cylinder 55 to control the depth to which the lid lifting mechanism 51, 94 can be placed into the mold 20 to engage the columnar portion 28 of the lid 24. The measuring ring 43 is also adjustable with respect to the fill tube 42 to allow changes in size and to account for wear.

In operation, as best seen in FIGS. 2 and 3, following the flow of crumb rubber from the time the crumb rubber has been placed into the storage bins 31, 32, the small diameter crumb rubber is conveyed from the storage bin 31 by the auger 31a rotatably driven by the electric motor 31b into the hopper 36 above the mixing tub 37 for the first mixer 34. The hopper 36 can be sized to provide the proper volume of crumb rubber for the mixer 34 with a switch or sensor (not shown) located to stop the operation of the motor 31b when the proper volume of crumb rubber has been placed into the hopper 36. Independently, the same operation is happening with respect to the large diameter crumb rubber being conveyed from the storage bin 32 by the auger 32 a driven by the electric motor 32b. Similarly, the proper volume of binder is placed into the binder tube 36a for both mixers 34, 35 and the proper volume of dye is placed into the dye tube 36b.

With the doors closed to the bottom of the mixing tubs 37 for the mixers 34, 35, closing off the fill tubes 42, the crumb rubber, binder and dye (with respect to mixer 34) is dumped into the mixing tub 37 in the proper quantities. The mixer 34, 35 is then rotated with the mixing arms 38a, 38b thoroughly mixing the ingredients whereupon the trap doors to the fill tubes are opened to allow the paddles 39 to sweep the mixture into the fill tubes 42. The mixers 34, 35 can be continued to rotate until the fill tubes have emptied to a predetermined level, at which a sensor (not shown) could be located, whereupon the trap doors are then closed and the mixing cycle is repeated. As described above, the measuring cup 43 shuttles back and forth moving a measured quantity of colored crumb rubber material into the molds 20 as they are indexed along the production line 40. At the adjacent level station 45, the leveling heads 46 are lowered into the colored material mixture to level the material dumped into the mold 20 by the measuring cup 43.

After leveling at station 45, the molds are indexed to the next station 48 at which a second layer of crumb material and binder mixture is added on top of the colored material layer placed at the bottom of the mold 20 by a second fill tube and corresponding measuring cup 43. Preferably, this second layer of mixture uses larger diameter crumb rubber particles to provide a cost effective base layer for the paving block 10 being formed within the mold 20. The adjacent leveling layer 49 operates similarly to the previous leveling layer 45 to level the slumped material just deposited at the fill black material station 48. To accomplish this task, the leveling head 46 is adjusted to dip the pins 47 into the very top of the slumped mixture only a short distance.

After the molds have been properly filled with material, the molds are then indexed into the next station 50 at which the lids are picked up off the conveying rails 81 by a lid lifting mechanism 51 using an inflatable balloon to engage the hollow interior of the lid 24. The lid 24 is properly placed on the top of the leveled mixture and pressed by the press plate 58 to compress the mixture within the mold 20. A blast of compressed air from the latch insert member 59 is operable to force the latches 25 outwardly into engagement with the adjacent latch holes 29 in body portion 22 of the mold 20 to fix the lid 24 into a compressing position. The latched molds 20 are then conveyed onto an end transfer station 60 to convey the molds 20 laterally from the production line 40 to the beginning of the oven line 70, as described above with a truck 65 shuttling back and forth to effect the transfer.

The latched molds 20 are then passed through the oven line 70 starting with an oven portion 71 that is heated by a large gas furnace 75 blowing heated air into upper and lower plenums 72, 73 to raise the temperature of the outer surface of the molds 20 to between 200 and 300 degrees Fahrenheit. A sensor properly located on the discharge side of the oven portion 71 can monitor the temperature of the molds 20 exiting the oven portion 71 and provide data along with a thermocouple to effect control of the gas furnace 75 to adjust the temperature of the oven portion 71 appropriately. Following the oven portion 71, the molds are indexed along a cool down portion 77 before being conveyed by a second end transfer mechanism 69, substantially identical to the first end transfer station 60 to convey the molds from the end of the oven line 70 laterally to the beginning of the production line 40.

Once returned to the production line 40, the molds are first moved to an unlatch press station 90 at which a press plate 91 is pushed down on the top of the lid 24 to slightly compress the paving block formed therebeneath against the bottom portion of the mold 20. A blast of compressed air from an unlatch member encircling the mold 20 against the actuating tab 25a can force the latches 25 out of engagement with the holes 29 in the body portion 22, allowing the lid 24 to be unlatched from the body portion 22. Returning the press plate 91 to the elevated home position allows the slight expansion of the formed paving block 10 to push upwardly on the lid 24 so that the latches 25 cannot re-engage the holes 29 in the body portion 22. The mold 20 can then be advanced to the next station, the remove lid station 93.

First, the mold clamping mechanism 95 engages the lugs 23a on the conveying ring 23 to hold the body portion 22 against the rails 81. Then, a lid lifting mechanism 51, identical to the mechanism 53 used at the install lid station 50, lowers from its elevated home position and engages the interior of the columnar portion 28 of the lid 24 by expanding the inflatable balloon 52 until it is tight against the columnar portion 28. The lid lifting mechanism 51 is then raised by the cylinder 55, taking the lid 24 with it. The lid lifting mechanism 51 is then moved forwardly on the track 53 and lowered to the rails 81 where the lid 24 is placed ahead of the body portion 22. The lid lifting mechanism 51 can then return to the home position so the mold 20 can be indexed forwardly to the next station, the remove piece station 100, after being released by the mold clamping mechanism 95. In moving from the remove lid station 93 to the remove piece station 100, the conveying mechanism 80 advances the body portion 22 by pushing the pivoted dogs 85 against the conveying ring 23 extending below the upper surface of the rails 81. The lid 24, which lies on the rails 81 immediately in front of the body portion 22, is pushed forwardly by the body portion 22 as it is advanced to the next station.

At the remove piece station 100, the mold clamping mechanism 95 again grasps the conveying ring 23 by pivoting levers 99 into engagement with the lugs 23a. The piece holding mechanism 103 lowers to engagement with the exposed surface, the textured bottom surface 14 since the paving block 10 is formed upside down, where the pins 104a are extended out of the angled cylinders 104 into the body of the paving block 10 and the lift cylinder 103 is placed into a float mode. At the same time, a pneumatic tube 105 is raised into position against the lower surface of the bottom portion 21 of the body portion 22 encircling the pop valve 106. Once the pins 104a have engaged the paving block 10, a pressurized flow of air is forced through the pop valve 106 by the air gun 105a to push the paving block 10 and the engaged piece holding mechanism 103 upwardly. Once the paving block 10 clears the body portion 22 of the mold 20, the lift cylinder 103 engages to continue lifting the paving block 10 upwardly away from the mold 20. Once elevated sufficiently, the piece holding mechanism 103 is moved forwardly along its track 109 to a position above the takeoff turntable 110, as is shown in FIG. 14.

The takeoff turntable 110 is rotated continuously at about 10 RPM to convey paving blocks 10 placed thereon around its axis of rotation. As depicted in FIGS. 14 and 15, the piece holding mechanism 103 lowers the engaged paving block 10 to just above the upper surface of the turntable 110 and retracts the pins 104a to disengage the paving blocks so that they are then deposited on the turntable 110. The rotating turntable 110 gently rotates the paving blocks 10 around the axis of rotation into engagement with a push-off bar 111 which guides the paving blocks 10 into a connection device 115, which can include a conveyor belt to remove the discharged paving blocks 10 to a remote location for further processing and packing. The now-empty molds are then advanced to the next station, which due to the size of the various components is located under the turntable 110. As a result, this next station 116 becomes an "empty station", as is preferably the following station 117, which is designed into the production line 40 to provide room for growth of the process.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A method of manufacturing a rubber paving block comprising the steps of:
providing a mold configured in a predetermined shape, said mold having a body member defining a cavity and a lid member movable into said cavity, said mold being movable along a process line having a plurality of stations at which production steps are undertaken;
pouring a mixture of crumb rubber and binder into the cavity of said body member at a first station;
placing said lid member into the cavity of said body member;
compressing said mixture by pressing said lid into a predetermined compression position;
latching said lid member into said compression position;
transferring said mold to an oven to heat said mold to a predetermined range of curing temperature to cure said mixture and create said rubber paving block;
cooling said mold to a temperature within a range less than said range of said curing temperature;
unlatching and removing said lid member from said body member;
extracting said cured rubber paving block from said body member; and
returning said mold to said first station for continued production of said rubber paving blocks.
2. The method of claim 1 wherein said placing step includes the steps of:
lifting said lid member from a position adjacent said body member with a pneumatic lifting apparatus;
positioning said lid member into alignment with said cavity; and
releasing said lid member within said cavity.
3. The method of claim 2 wherein said lifting step includes the steps of:
moving said pneumatic lifting apparatus into engagement with said lid member; and
inflating an air bladder to engage an interior surface of an upright tubular column of said lid member until friction between said air bladder and said upright tubular column permits said lifting apparatus to elevate said lid member.
4. The method of claim 3 wherein said releasing step includes the step of deflating said air bladder to disengage said upright tubular column and permit said lifting apparatus to return to a home position.
5. The method of claim 1 wherein said compressing step includes the step of engaging a first pneumatic press apparatus with said lid member to move said lid member into said compression position, said first press apparatus including a press member that extends into an upright tubular column of said lid member.
6. The method of claim 5 wherein said latching step is performed during said compressing step and includes the steps of:

aligning compressed air jets of said press member with latch devices mounted on said lid member;

blowing a burst of compressed air outwardly against said latch devices to position said latch devices into engagement with said body member; and removing said first press apparatus from engagement with said lid member while said latch devices retain said lid member in said compression position.

7. The method of claim 6 wherein said unlatching and removing step includes the steps of:

engaging a second pneumatic press apparatus with said lid member to depress said lid member sufficiently to release latching pressure on said latching devices, said second press apparatus including second compressed air jets positionable radially outwardly from said latch devices;

blowing a burst of compressed air inwardly on said latch devices to disengage said latch devices from said body member;

moving a pneumatic lifting device into engagement with an interior surface of said upright tubular column of said lid member; and inflating an air bladder to engage said interior surface of said upright tubular column until friction between said air bladder and said upright tubular column permits said lifting apparatus to elevate said lid member from said body member.

8. The method of claim 1 wherein said extracting step is performed after said step of unlatching and removing said lid member and includes the steps of:

engaging a lifting mechanism into an upper surface of said cured rubber paving block;

blowing compressed air through a valve in a bottom surface of said body member to create a lifting force against a lower surface of said cured rubber paving block;

lifting said cured rubber paving block with said lifting mechanism along a generally vertical path simultaneously with the step of blowing compressed air against said lower surface of said cured rubber paving block until said cured rubber paving block is removed from said body member; and depositing said extracted rubber paving block for removal to a remote location.

9. The method of claim 8 wherein said step of engaging a lifting mechanism includes the step of:

positioning an extendable pin mechanism adjacent said upper surface of said cured rubber paving block; and inserting at least three pins extending from said pin mechanism into said cured rubber paving block, said pins being oriented at an angle to said generally vertical path.

10. The method of claim 9 wherein said pins are retracted from said cured rubber paving block back into said pin mechanism during said depositing step.

11. The method of claim 1 further comprising the steps of:

mixing said crumb rubber and said binder in a mixer before pouring said mixture into the cavity of said body member.

12. The method of claim 11 wherein said pouring step includes the step of leveling said mixture with a stirring apparatus inserted into said mixture within said cavity of said body member.

13. The method of claim 11 wherein said pouring step includes the steps of:

pouring a first dyed portion of said mixture into said cavity of said body portion; and subsequently pouring a second base portion of said mixture into said cavity of said body portion on top of said dyed portion.

14. The method of claim 13 further comprising the step of:

after said step of pouring a first dyed portion of said mixture, leveling said first dyed portion of said mixture with a first stirring apparatus inserted into said first dyed portion of said mixture within said cavity of said body member.

15. The method of claim 13 further comprising the step of:

after said step of pouring a second base portion of said mixture, leveling said second base portion of said mixture with a second stirring apparatus inserted into only said second base portion of said mixture without disturbing said first dyed portion of said mixture within said cavity of said body member.

16. The method of claim 1 wherein said process line is divided into a production line and an oven line, said steps of pouring, placing, compressing, latching, unlatching, extracting and returning said mold being performed at stations of said production line, said steps of heating and cooling said mold being performed at stations on said oven line.

17. The method of claim 16 wherein said process line is controlled by a programmable logic controller, such that each process step performed at each respective station must be completed before said molds are indexed to a respective subsequent station, said temperature of said oven line being regulated by said controller.

18. An automated process for manufacturing rubber paving blocks comprising the steps of:

mixing crumb rubber and a binder material into a mixture of predetermined proportions;

positioning a mold configured in a predetermined shape at a first station of a production line, said mold having a body member defining a cavity and a separable lid member positionable within said cavity in communication with said body member, said mold being movable along said production line having a plurality of stations at which production steps are undertaken;

pouring said mixture of crumb rubber and binder material into the cavity of said body member at said first station;

placing said lid member into the cavity of said body member with a pneumatic lifting apparatus;

compressing said mixture by pressing said lid into a predetermined compression position;

latching said lid member into said compression position by moving latches mounted on said lid member into engagement with said body member to exert a holding force on said latches to retain said lid member in said compression position;

heating said mold in an oven to raise the temperature of said mold to a first predetermined range of temperatures to cure said mixture and create a cured rubber paving block;

cooling said mold to a temperature within a second range of temperatures less than said first range of temperatures;

disengaging said latches from said body member;

removing said lid member from said body member;

extracting said cured rubber paving block from said body member by engaging a lifting apparatus with an upper surface of said cured rubber paving block and by blowing compressed air through a valve in a bottom portion of said body member to exert a lifting force on said cured rubber paving block; and returning said mold to said first station for continued production of said rubber paving blocks.

19. The process of claim 18 wherein placing step includes the steps of:

moving said pneumatic lifting device into engagement with said lid member to lift said lid member from a position adjacent said body member;

inflating an air bladder to engage an interior surface of an upright tubular column of said lid member until friction between said air bladder and said upright tubular column permits said lifting apparatus to elevate said lid member;

positioning said lid member into alignment with said cavity; and releasing said lid member within said cavity.

20. The process of claim 19 wherein said compressing step includes the step of engaging a first pneumatic press apparatus with said lid member to move said lid member into said compression position, said first press apparatus including a press member that extends into an upright tubular column of said lid member, said latching step being performed during said compressing step and includes the steps of:

aligning compressed air jets of said press member with latch devices mounted on said lid member;

blowing a burst of compressed air outwardly against said latch devices to position said latch devices into engagement with said body member; and removing said first press apparatus from engagement with said lid member while said latch devices retain said lid member in said compression position.

* * * * *